United States Patent
Aghdaie et al.

(10) Patent No.: US 10,459,827 B1
(45) Date of Patent: Oct. 29, 2019

(54) MACHINE-LEARNING BASED ANOMALY DETECTION FOR HETEROGENOUS DATA SOURCES

(71) Applicant: Electronic Arts Inc., Redwood City, CA (US)

(72) Inventors: Navid Aghdaie, San Jose, CA (US); John Kolen, Half Moon Bay, CA (US); Mohamed Marwan Mattar, San Francisco, CA (US); Mohsen Sardari, Redwood City, CA (US); Su Xue, Fremont, CA (US); Kazi Atif-Uz Zaman, Foster City, CA (US)

(73) Assignee: ELECTRONIC ARTS INC., Redwood City, CA (US)

( * ) Notice: Subject to any disclaimer, the term of this patent is extended or adjusted under 35 U.S.C. 154(b) by 18 days.

(21) Appl. No.: 15/077,791

(22) Filed: Mar. 22, 2016

(51) Int. Cl.
  *G06F 9/44* (2018.01)
  *G06F 11/36* (2006.01)
  *G06N 20/00* (2019.01)

(52) U.S. Cl.
  CPC ......... *G06F 11/3672* (2013.01); *G06N 20/00* (2019.01)

(58) Field of Classification Search
  None
  See application file for complete search history.

(56) References Cited

U.S. PATENT DOCUMENTS

| | | | |
|---|---|---|---|
| 6,769,016 B2 | 7/2004 | Rothwell et al. | |
| 7,877,482 B1 | 1/2011 | Ashcraft et al. | |
| 7,974,849 B1 | 7/2011 | Begole et al. | |
| 8,370,389 B1 | 2/2013 | Dotan | |
| 8,589,174 B2 | 11/2013 | Nelson et al. | |
| 8,661,547 B1 * | 2/2014 | Kononov | G06F 21/577 713/176 |
| 8,794,508 B1 | 8/2014 | Pascal | |
| 8,881,266 B2 | 11/2014 | Chow et al. | |
| 9,112,895 B1 * | 8/2015 | Lin | H04L 63/1416 |
| 9,231,936 B1 | 1/2016 | Wang et al. | |
| 9,517,402 B1 | 12/2016 | Vogel | |

(Continued)

OTHER PUBLICATIONS

Alex Beutel, Wanhong Xu, Venkatesan Guruswami, Christopher Palow, and Christos Faloutsos. "Copycatch: stopping group attacks by spotting lockstep behavior in social networks." In WWW, pp. 119-130. ACM, 2013.

(Continued)

*Primary Examiner* — Insun Kang
(74) *Attorney, Agent, or Firm* — Knobbe, Martens, Olson & Bear, LLP

(57) ABSTRACT

Embodiments of an automated anomaly detection system are disclosed that can detect anomalous data from heterogeneous data sources. The anomaly detection system can provide an automated system that identifies data anomalies within data sets received from application host systems. The anomaly detection system may identify patterns using machine learning based on data set characteristics associated with the each data set. The anomaly detection system may generate a model that can be applied to existing data sets received from the application host systems in order to automatically identify anomalous data sets. The anomaly detection system may automatically identify the anomalous data sets and implement appropriate actions based on the determination.

20 Claims, 11 Drawing Sheets

(56) References Cited

U.S. PATENT DOCUMENTS

| | | | |
|---|---|---|---|
| 9,529,777 | B2 | 12/2016 | Tjew et al. |
| 9,992,018 | B1 | 6/2018 | Tjew et al. |
| 10,193,772 | B1 | 1/2019 | Tjew et al. |
| 2002/0165838 | A1 | 11/2002 | Vetter |
| 2004/0039630 | A1 | 2/2004 | Begole et al. |
| 2005/0014559 | A1 | 1/2005 | Mattice et al. |
| 2005/0108384 | A1 | 5/2005 | Lambert et al. |
| 2006/0036727 | A1 | 2/2006 | Kurapati et al. |
| 2006/0093142 | A1 | 5/2006 | Schneier et al. |
| 2007/0043851 | A1 | 2/2007 | Yellamraju et al. |
| 2007/0111794 | A1 | 5/2007 | Hogan et al. |
| 2007/0121596 | A1 | 5/2007 | Kurapati et al. |
| 2007/0266394 | A1 | 11/2007 | Odent et al. |
| 2008/0059474 | A1 | 3/2008 | Lim |
| 2008/0065994 | A1 | 3/2008 | Wang et al. |
| 2008/0209544 | A1 | 8/2008 | Kempka |
| 2008/0310312 | A1 | 12/2008 | Acharya et al. |
| 2009/0054123 | A1 | 2/2009 | Mityagin et al. |
| 2009/0143144 | A1 | 6/2009 | Schluessler et al. |
| 2009/0164788 | A1 | 6/2009 | Cho et al. |
| 2009/0219895 | A1 | 9/2009 | Wu |
| 2009/0235226 | A1 | 9/2009 | Murthy et al. |
| 2010/0162405 | A1 | 6/2010 | Cook et al. |
| 2011/0012603 | A1 | 1/2011 | Bose et al. |
| 2011/0167269 | A1 | 7/2011 | Baykal et al. |
| 2012/0036250 | A1* | 2/2012 | Vaswani ............... G01D 4/004 709/224 |
| 2012/0047578 | A1 | 2/2012 | Lee et al. |
| 2012/0137367 | A1 | 5/2012 | Dupont et al. |
| 2013/0072306 | A1 | 3/2013 | Parnprome |
| 2013/0111019 | A1 | 5/2013 | Tjew et al. |
| 2013/0296039 | A1 | 11/2013 | Engineer et al. |
| 2013/0311977 | A1 | 11/2013 | Nieminen et al. |
| 2015/0106927 | A1* | 4/2015 | Ferragut ............. H04L 63/1416 726/23 |
| 2015/0238866 | A1 | 8/2015 | Khabazian |
| 2015/0341379 | A1* | 11/2015 | Lefebvre ............. H04L 43/0894 726/22 |
| 2016/0110528 | A1 | 4/2016 | Gupta et al. |
| 2016/0142435 | A1* | 5/2016 | Bernstein ............ H04L 63/1425 726/23 |
| 2016/0191654 | A1 | 6/2016 | Healey et al. |
| 2016/0217022 | A1* | 7/2016 | Velipasaoglu ........ G06F 11/079 |
| 2016/0359870 | A1* | 12/2016 | Gu ...................... G06F 21/552 |
| 2017/0060656 | A1* | 3/2017 | Bhattacharya ........ G06F 11/079 |
| 2017/0076217 | A1* | 3/2017 | Krumm ................. G06N 7/005 |
| 2017/0098067 | A1 | 4/2017 | Paluri et al. |
| 2017/0111378 | A1* | 4/2017 | Caffrey ............... G06N 99/005 |
| 2017/0134415 | A1* | 5/2017 | Muddu ............... H04L 63/1425 |
| 2017/0223036 | A1* | 8/2017 | Muddu ............... H04L 63/1416 726/23 |

OTHER PUBLICATIONS

"Blizzard Entertainment Uses Spyware to Verify EULA Compliance", Schneier on Security, posted Oct. 13, 2005, retrieved Aug. 14, 2015, http://www.schneier.com/blog/archives/2005/10/blizzard_entert.html, 25 pgs.

Bokai Cao, Francine Chen, Dhiraj Joshi, and Philip S Yu. "Inferring crowd-sourced venues for tweets." IEEE Big Data, pp. 639-648. IEEE, 2015.

Bokai Cao, Xiangnan Kong, and Philip S Yu. "Collective prediction of multiple types of links in heterogeneous information networks." In ICDM, pp. 50-59. IEEE, 2014.

Qiang Cao, Michael Sirivianos, Xiaowei Yang, and Tiago Pregueiro. "Aiding the detection of fake accounts in large scale social online services." In NSDI, pp. 197-210, 2012.

Cao, Qiang, et al. "Aiding the Detection of Fake Accounts in Large Scale Social Online Services", http://www.usenix.org/system/files/conference/nsdi12/nsdi12-final42_2.pdf, accessed Aug. 6, 2015, 14 pgs.

William Eberle and Lawrence Holder. "Discovering structural anomalies in graph-based data." ICDMW, pp. 393-398. IEEE, 2007.

Jing Gao, Feng Liang, Wei Fan, Chi Wang, Yizhou Sun, and Jiawei Han. "On community outliers and their efficient detection in information networks." In KDD, pp. 813-822. ACM, 2010.

Saptarshi Ghosh, Bimal Viswanath, Farshad Kooti, Naveen Kumar Sharma, Gautam Korlam, Fabricio Benevenuto, Niloy Ganguly, and Krishna Phani Gummadi. "Understanding and combating link farming in the twitter social network." In WWW, pp. 61-70. ACM, 2012.

Manish Gupta, Jing Gao, Xifeng Yan, Hasan Cam, and Jiawei Han. "On detecting association-based clique outliers in heterogeneous information networks." In ASONAM, pp. 108-115. IEEE, 2013.

Manish Gupta, Arun Mallya, Subhro Roy, Jason HD Cho, and Jiawei Han. "Local learning for mining outlier subgraphs from network datasets." In SDM. SIAM, 2014.

Zoltán Gyöngyi, Hector Garcia-Molina, and Jan Pedersen. "Combating web spam with trustrank." In VLDB, pp. 576-587. VLDB Endowment, 2004.

Bryan Hooi, Hyun Ah Song, Alex Beutel, Neil Shah, Kijung Shin, and Christos Faloutsos. "Fraudar: Bounding graph fraud in the face of camouage." In KDD. ACM, 2016.

Ming Ji, Jiawei Han, and Marina Danilevsky. "Ranking-based classification of heterogeneous information networks." In KDD, pp. 1298-1306. ACM, 2011.

Meng Jiang, Peng Cui, Alex Beutel, Christos Faloutsos, and Shiqiang Yang. "Catchsync: catching synchronized behavior in large directed graphs." In KDD, pp. 941-950. ACM, 2014.

Nitin Jindal and Bing Liu. "Opinion spam and analysis." In WSDM, pp. 219-230. ACM, 2008.

Xiangnan Kong, Bokai Cao, and Philip S Yu. "Multi-label classification by mining label and instance correlations from heterogeneous information networks." In KDD, pp. 614-622. ACM, 2013.

Xiangnan Kong, Philip S Yu, Ying Ding, and David J Wild. "Meta path-based collective classification in heterogeneous information networks." In CIKM, pp. 1567-1571. ACM, 2012.

Chao Liu, Xifeng Yan, Hwanjo Yu, Jiawei Han, and S Yu Philip. "Mining behavior graphs for "backtrace" of noncrashing bugs." In SDM, pp. 286-297. SIAM, 2005.

Qing Lu and Lise Getoor. "Link-based classification." In ICML, vol. 3, pp. 496-503, 2003.

Emaad Manzoor, Sadegh M Milajerdi, and Leman Akoglu. "Fast memory-efficient anomaly detection in streaming heterogeneous graphs." In KDD. ACM, 2016.

Jennifer Neville and David Jensen. "Iterative classification in relational data." In AAAI Workshop on Learning Statistical Models from Relational Data, pp. 13-20, 2000.

Jennifer Neville and David Jensen. Collective classification with relational dependency networks. In KDD Workshop on Multi-Relational Data Mining, pp. 77-91. Citeseer, 2003.

Caleb C Noble and Diane J Cook. "Graph-based anomaly detection." In KDD, pp. 631-636. ACM, 2003.

Myle Ott, Yejin Choi, Claire Cardie, and Jeffrey T Hancock. "Finding deceptive opinion spam by any stretch of the imagination." In ACL, pp. 309-319. ACL, 2011.

Bryan Perozzi and Leman Akoglu. "Scalable anomaly ranking of attributed neighborhoods." In SDM. SIAM, 2016.

Bryan Perozzi, Leman Akoglu, Patricia Iglesias Sanchez, and Emmanuel Muller. "Focused clustering and outlier detection in large attributed graphs." In KDD, pp. 1346-1355. ACM, 2014.

Prithviraj Sen, Galileo Namata, Mustafa Bilgic, Lise Getoor, Brian Galligher, and Tina Eliassi-Rad. "Collective classification in network data." AI magazine, 29(3):93, 2008.

Neil Shah, Alex Beutel, Brian Gallagher, and Christos Faloutsos. "Spotting suspicious link behavior with fbox: An adversarial perspective." In ICDM, pp. 959-964. IEEE, 2014.

Yizhou Sun, Jiawei Han, Xifeng Yan, Philip S Yu, and Tianyi Wu. "PathSim: Meta path-based top-K similarity search in heterogeneous information networks." In VLDB, 2011.

Yizhou Sun, Yintao Yu, and Jiawei Han. "Ranking-based clustering of heterogeneous information networks with star network schema." In KDD, pp. 797-806. ACM, 2009.

Ward, Mark, "Warcraft Game Maker in Spying Row", BBC News, published Oct. 31, 2005, retrieved Aug. 14, 2015, 1 pg.

(56) References Cited

OTHER PUBLICATIONS

Baoning Wu, Vinay Goel, and Brian D Davison. "Propagating trust and distrust to demote web spam." MTW, 190, 2006.

* cited by examiner

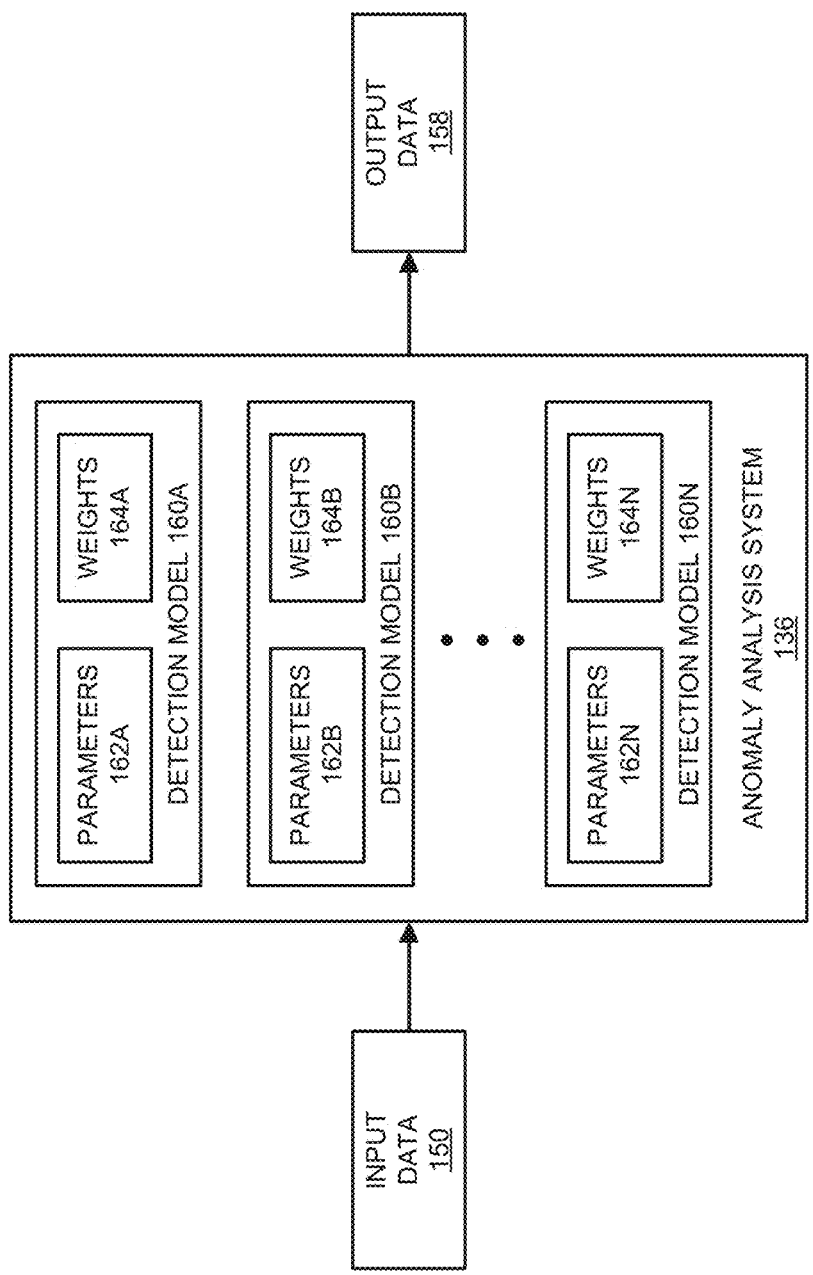

| Column | Statistic | Anomaly Score | Anomaly Details | Anomaly Annotation | |
|---|---|---|---|---|---|
| curr_exchange_rate | [unreadable] | 100.000 | Current: 1.00<br>Historical: 41.90 +/- 0.40 (20) | ○ Issue ○ Acceptable ○ Unspecified | Show Statistics |
| curr_exchange_rate | [unreadable] | 100.000 | Current: 1.00<br>Historical: 0.43 +/- 0.02 (20) | ○ Issue ○ Acceptable ○ Unspecified | Show Statistics |
| curr_exchange_rate | [unreadable] | 100.000 | Current: 0.00<br>Historical: 2.08 +/- 0.03 (20) | ○ Issue ○ Acceptable ○ Unspecified | Show Statistics |
| curr_exchange_rate | [unreadable] | 100.000 | Current: 1.00<br>Historical: 0.00 +/- 0.00 (20) | ○ Issue ○ Acceptable ○ Unspecified | Show Statistics |
| curr_exchange_rate | [unreadable] | 100.000 | Current: 1.00<br>Historical: 0.168 +/- 0.02 (20) | ○ Issue ○ Acceptable ○ Unspecified | Show Statistics |
| curr_exchange_rate | [unreadable] | 100.000 | Current: 0.00<br>Historical: 1.00 +/- 0.00 (20) | ○ Issue ○ Acceptable ○ Unspecified | Show Statistics |
| curr_exchange_rate | [unreadable] | 100.000 | Current: 0.00<br>Historical: 0.90 +/- 0.01 (20) | ○ Issue ○ Acceptable ○ Unspecified | Show Statistics |
| curr_exchange_rate | [unreadable] | 100.000 | Current: 0.00<br>Historical: 0.36 +/- 0.01 (20) | ○ Issue ○ Acceptable ○ Unspecified | Show Statistics |
| curr_exchange_rate | [unreadable] | 100.000 | Current: 0.00<br>Historical: 1.46 +/- 0.00 (20) | ○ Issue ○ Acceptable ○ Unspecified | Show Statistics |
| date_sid | [unreadable] | 100.000 | Current: 20,160,501.00<br>Historical: 20,160,420.50 +/- 5.77 (20) | ○ Issue ○ Acceptable ○ Unspecified | Show Statistics |

FIG. 4A

MACHINE-LEARNING BASED ANOMALY DETECTION FOR HETEROGENOUS DATA SOURCES

BACKGROUND

Video games can communicate with online servers during operation of the video game. For example, a game may be a massively multiplayer game that utilizes a persistent online world hosted on a game server. Video games may include online marketplaces and auction houses for the purchase of virtual goods and services for use within the game application. The online games have many different systems that interoperate in order to provide a functional and enjoyable game environment for players. As games increase in size and complexity, the game systems require more complex hardware to host the video game and can become more prone to failure. System failures or bugs can, in some instances, prevent players from accessing or playing their games. Players can become very frustrated when the game quits working due to problems or system failures caused by the game provider. In order to minimize downtime and keep the games operational, video game providers are required to constantly monitor and maintain their online video game systems. Monitoring and maintaining the online video game can be a difficult task, especially as video game increase in size and complexity.

SUMMARY OF EMBODIMENTS

The systems, methods, and devices of this disclosure each have several innovative aspects, no single one of which is solely responsible for the all of the desirable attributes disclosed herein.

In one embodiment, an anomaly detection computing system, the system comprising a host application computing system including one or more processors and in electronic communication with an anomaly detection server, the host application server computing system configured to execute and host instances of a game application and establish gameplay sessions with a plurality of users; a host data store configured to store host application data associated with operation of the host application computing system, wherein the host application data comprises a plurality of data sets, wherein individual data sets are associated with operations executed by the host application server computing system for operation of aspects of the game application; the anomaly detection server comprising computer hardware and in electronic communication with the host application server computing system, the anomaly detection server comprising: a game application aggregation system configured to communicate with the host application computing system and aggregate host application data received from the host application computing system, wherein the host application data comprises a plurality of data sets associated with one or more aspects of operation of the host application computing system; an anomaly analysis system configured to: identify an anomaly detection model for analysis of a first data set of the plurality of data sets, wherein the anomaly detection model is generated based, at least in part on, historical data associated with host application server; determine an anomaly detection score associated with each analyzed data set based, at least in part, on the application of identified anomaly detection model to the data set; determine whether the anomaly detection score exceeds an anomaly detection threshold; in response to determining that the anomaly detection score exceeds the anomaly detection threshold, generate an anomaly event, and generate instructions to perform an anomaly event action associated with the anomaly detection threshold.

In another embodiment, an anomaly detection method comprising communicating with a host application computing system, wherein the host application computing system is configured to execute and host instances of a game application and establish gameplay sessions with a plurality of users; aggregating host application data received from the host application computing system, wherein the host application data comprises a plurality of data sets associated with one or more aspects of operation of the host application computing system; identifying an anomaly detection model for analysis of a first data set of the plurality of data sets, wherein the anomaly detection model is generated based, at least in part on, historical data associated with host application server; determining an anomaly detection score associated with each analyzed data set based, at least in part, on the application of identified anomaly detection model to the data set; determining whether the anomaly detection score exceeds an anomaly detection threshold; in response to determining that the anomaly detection score exceeds the anomaly detection threshold, generating an anomaly event; and generating instructions to perform an anomaly event action associated with the anomaly detection threshold.

In another embodiment, a non-transitory computer readable medium comprising computer-executable instructions for anomaly detection that, when executed by a computing system, cause the computing system to: communicate with a host application computing system, wherein the host application computing system configured to execute and host instances of a game application and establish gameplay sessions with a plurality of users; aggregate host application data received from the host application computing system, wherein the host application data comprises a plurality of data sets associated with one or more aspects of operation of the host application computing system; identify an anomaly detection model for analysis of a first data set of the plurality of data sets, wherein the anomaly detection model is generated based, at least in part on, historical data associated with host application server; determine an anomaly detection score associated with each analyzed data set based, at least in part, on the application of identified anomaly detection model to the data set; determine whether the anomaly detection score exceeds an anomaly detection threshold; in response to determining that the anomaly detection score exceeds the anomaly detection threshold, generate an anomaly event.

Although certain embodiments and examples are disclosed herein, inventive subject matter extends beyond the examples in the specifically disclosed embodiments to other alternative embodiments and/or uses, and to modifications and equivalents thereof.

BRIEF DESCRIPTION OF THE DRAWINGS

Throughout the drawings, reference numbers are re-used to indicate correspondence between referenced elements. The drawings are provided to illustrate embodiments of the subject matter described herein and not to limit the scope thereof.

FIG. 2C presents a block diagram illustrating an embodiment of applying an anomaly detection model to user accounts by an analysis system.

FIGS. 4A-4C illustrate embodiments of user interfaces for an anomaly detection system.

DETAILED DESCRIPTION OF EMBODIMENTS

Overview

Figure 1:
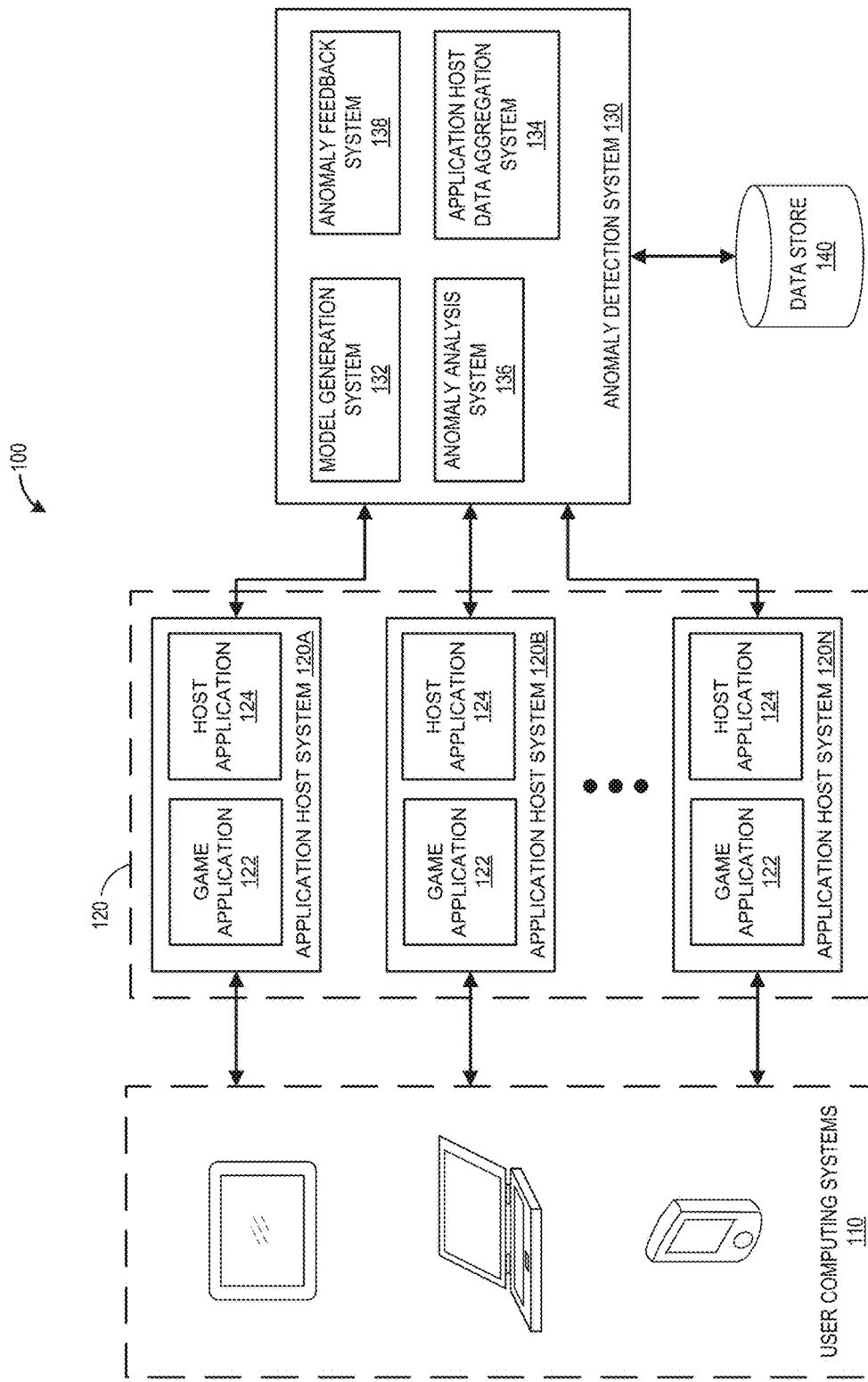
FIG. 1 illustrates an embodiment of a networked computing environment that can implement one or more embodiments of an anomaly detection system.

Large-scale network-based interactive game application systems can generate large amounts of data. The complexities of the data pipelines, varying system architectures, and the large number of heterogeneous data structures that are being generated can make the systems difficult to manage and monitor. The large data sources can be naturally prone to data integrity issues. Each system can be controlled, monitored, and maintained by different engineers using different processes and different systems. Given the complexities of monitoring multiple large-scale heterogeneous data systems, it can be important to have an automated system that can identify potential problems associated with system during runtime. A system for automatically tracking the data received from each data source and determining whether the variations in the data can help to identify potential problems or issues with the systems.

An application host system configured to host and operate a network-based game application can include many independent systems that interoperate to maintain and support the operation of the game application and/or other network-based applications. For example, an application host system may include game application servers configured to generate and maintain persistent virtual environments, download servers, game application update servers, transaction processing servers, and the like. The individual systems within the application host system can interact with each other and independently perform various operational tasks. Each system can generate different types of data, use different data structures, and use different programming interfaces. During operation, any number of the systems within a host application system may fail or perform incorrectly in some way. It can be important to monitor the systems to verify that the systems are operating correctly. For example, a game server may fail or a game update may introduce a bug that incorrectly changes the cost of items in a virtual marketplace.

An anomaly detection system can provide an automated system that identifies data anomalies within the data generated by the host application systems. The anomaly detection system can be configured to interface with each of the application host systems in order to aggregate the heterogeneous data types into a central data processing and analysis system. The anomaly detection system can use machine learning algorithms to generate anomaly detection models or electronic filters. A model generation system can build machine learning models that can be applied to analyze the data received from each data source. The models can be generated by analyzing historical data values, feedback data, contextual data, and other information associated with the application host systems. In some embodiments, the machine learning models can be specific to a data source or a data set.

The generated models can be efficient at detecting potential anomalies in data received from the application host systems. The anomaly detection system can analyze data sets received from the application host systems during runtime to determine whether potential problems exist in the analyzed data sets. In some embodiments, the anomaly detection system can determine in real-time or near-real-time detection of anomalous events. After an anomaly event is detected, an automated system can be configured to provide alerts to subscribers responsible for the data set associated with generating the alert. The alerts can help subscribers, such as engineers or system administrators, to determine whether a problem exists.

In an illustrative example, there may be an increase in game application downloads from a download server on Christmas day, which represents a significant spike in downloads in comparison to previous days. However, in comparison, to the previous year, the number of downloads may be relatively normal. The model can be configured to analyze the input data to determine whether the received data is consistent with expected variations in the data or inconsistent with the expected data. When the data is inconsistent with the expected data, or in other words, inconsistent with the modeled behavior of the data, the system can generate an anomaly event. An alert that includes the detected anomaly event can be provided to a subscriber associated with the data set. For example, the anomaly detection system may determine that a particular game application server is experiencing a very high number of requests that is inconsistent with the anomaly detection model. The anomaly detection system can generate an anomaly event and provide an alert to a subscriber associated the particular data.

The anomaly detection system can receive feedback regarding whether the detected anomaly was actually an error that need to be corrected. The system can utilize feedback information (such as, for example, identification of errors and false positives) and contextual information (such as, for example, designated tags identifying conditional modifiers associated with the data) to customize and update the detection models. In some embodiments, the system can include tags or other type of identifiers that can be used to identify the correct algorithms for analyzing the input data. For example, a tag may designate a specific day, a holiday, a weekend, or other type of identifier that the system can use to determine the correct analysis to perform on the received data set. Over time, the system can use machine learning algorithms to improve the detection of anomalies based on the continued analysis. The anomaly detection system can generate a user interface where a user can visualize the results of the anomaly detection analysis. The users can provide feedback regarding detected anomalies, such as feedback information and contextual information.

In some embodiments, when an anomaly is detected, the system can provide explanations indicating the possible cause of an anomaly. For example, the system can explore similarities and correlations across multiple data sources to automatically identify relationships between the detected anomaly and previously identified anomalies, which can help explain the cause of the detected anomaly.

I. Overview of Anomaly Detection System

FIG. 1 illustrates an embodiment of a computing environment 100 for implementing an anomaly detection system 130. The environment 100 includes a plurality of user computing systems 110, a plurality of application host systems 120, and an anomaly detection system 130.

The user computing system 110, the application host system 120, and the anomaly detection system 130 may communicate via one or more communication networks. Multiple distinct and/or distributed networks may be utilized to facilitate communication. For example, the network can include one or more of a wide area network (WAN), a local area network (LAN), a cellular network, an ad hoc network, a satellite network, a wired network, a wireless network, and so forth. In some embodiments, the network can include the Internet.

A. Application Host System

The application host systems 120A-N represent a plurality of application host systems (generally referenced by callout 120). Though multiple systems are illustrated, in some embodiments, only a single application host system may be present. The application host system can include one or more game applications 122 and one or more host applications 124.

The application host system 120 can enable multiple users or computing systems to access a portion of a game application 122 and/or host application 124 executed or hosted by the application host system 120. In some embodiments, the portion of the game application 122 executed by application host systems 120 may create a persistent virtual environment. This virtual environment, such as an instanced environment or a persistent virtual world, may enable one or more users to interact with the virtual environment and with each other in a synchronous and/or asynchronous manner. In some cases, multiple instances of the virtual environment may be created or hosted by the application host system 120. A set of users may be assigned to or may access one instance of the virtual environment while another set of users may be assigned to or may access another instance of the virtual environment. In some embodiments, the application host system 120 may execute a hosting application for executing various aspects of a game environment. For example, in one embodiment, the game application 122 may be a competitive game, such as a first person shooter or sports game, and the application host system 120 can provide a dedicated hosting service for hosting multiplayer game instances or facilitate the creation of game instances hosted by user computing devices.

In some embodiments, the application host system 120 may include one or more host applications 124. The host applications can include additional applications and/or services configured to operate on the application host system 120. In some embodiments, the host applications 124 can provide an application that a user can interact with, such as a lobby or other environment for outside of the game application 122. Such environments may include environments for conducting transactions between players, such as an auction house or type of environment for facilitating transactions, like an exchange of virtual items between user accounts. In some embodiments, the host applications 124 may be applications that are opaque to a front end user and are configured for managing one or more operational aspects of the application host system 120.

B. User Computing Systems

The user computing systems 110 may include hardware and software components for establishing communications over a communication network (not shown). For example, the user systems 110 may be equipped with networking equipment and network software applications (for example, a web browser) that facilitate communications via one or more networks (for example, the Internet or an intranet). The user computing system 110 may have varied local computing resources such as central processing units and architectures, memory, mass storage, graphics processing units, communication network availability and bandwidth, and so forth. Further, the user computing system 110 may include any type of computing system. For example, the user computing system 110 may include any type of computing device(s), such as desktops, laptops, video game platforms, television set-top boxes, televisions (for example, Internet TVs), network-enabled kiosks, car-console devices computerized appliances, wearable devices (for example, smart watches and glasses with computing functionality), and wireless mobile devices (for example, smart phones, PDAs, tablets, or the like), to name a few. In some embodiments, the user computing system 110 may include one or more of the embodiments described below with respect to FIG. 7.

Typically, the user computing system 110 is capable of executing a game application, such as a video game, that may be stored and/or executed in a distributed environment. For example, the user computing system 110 may execute a portion of a game and the application host system 120 may execute another portion of the game, such as the game application 122. For instance, the game may be a massively multiplayer online role-playing game (MMORPG) that includes a client portion executed by the user computing system 110 and a server portion executed by one or more application host systems 120. For the present discussion, the game application can include a distributed application or an application that includes a portion that executes on the user computing system 110 and a portion that executes on at least one of the application host systems 120. The user computing system 110 may interface with a host application 124 on the application host system 120. The host application 124 can act as an interface or hub for the computing system 110 to interface with the application host system 122.

C. Anomaly Detection System

In the illustrated embodiment, the anomaly detection system 130 includes a model generation system 132, a host application data aggregation system 134, an anomaly analysis system 136, a feedback system 138, and one or more data stores 140. The anomaly detection system 130 can be in communication with the application host systems 120 and/or one or more data stores. Each of the systems of the anomaly detection system 130 will be described in more detail below.

1. Host Application Data Aggregation System

The host application data aggregation system (or "data aggregation system") 134 can aggregate data associated with operation of the game applications 122, the host applications 124, and/or the application host systems 120. The aggregated data can generally be referred to as host application data. The data aggregation system 134 can be configured to interface with each application host system 120 in order to aggregate the host application data associated with operational aspects each system. The data aggregation system 134 can aggregate the host application data for further processing by the model generation system 132 and the anomaly analysis system 136.

Operational aspects of the host application system can include server status, the number of instances of a game application, number of users playing a game, number of game downloads, gameplay data, user communication data, gameplay telemetry data, host communication data, user account information, transaction information, virtual item product transaction data, quality of service metrics, and other types of data associated with the operation of the game applications 122, host applications 124, and/or the application host systems 120.

The data aggregation system 134 can include one or more rule sets that can be used to determine data aggregation parameters used for aggregation and storage of data associated with an application host system 120. In some embodiments, each game application 122, host application 124, and/or aspect of the application host system 120 can have different data aggregation rule sets. The data received from application host systems 120 can be received in the form of data tables. Each data table can be received from a specific data source. The data source can be any entity that provides data to the data aggregation system 134. The data aggregation system 134 can be configured to receive, process, and store the data tables received from the each application host system 120 in accordance with the defined rule set. A data table can be a schema with a defined number of rows and columns. The data tables can include individual data sets. For example, each column within a data table can be an individual data set. A data table can include one or more data sets. Each data set received by the data aggregation system 134 can be associated with one or more operational aspects of the application host system 120. Each data set can have characteristics that define the attributes and types of data stored within the data set. In some embodiments, individual data sets may have specific data aggregation rule sets. The data sets within a data table may share the same data aggregation rule sets or have different rule sets. In some embodiments, when the data tables are received, each data set can undergo additional statistical analyses associated with the data set, such as, for example a mean, standard deviation, maximum value, minimum value, and other statistical analyses of the data set. Additionally, data tables can undergo various transformative operations, such as transform, merge, split, and other operations that can be used to form one or more additional data tables from the original data table(s). The newly formed data tables can undergo the same anomaly analyses.

Each data set can be received and/or retrieved by the data aggregation system 134 based on event-based and/or time-based rules associated with a data set. The event-based rules can be used to trigger when the data sets are to be received and/or retrieved by the data aggregation system 134. Some event-based rules can be based on thresholds (such as, for example, when a data set reaches a defined number of data elements), occurrence of specific event (such as, for example, after termination of a game instance), and/or other event-based rules. The time-based rules can be based on one or more for temporal limitations associated with a data set. For example, data sets may be received and/or retrieved by the data aggregation system 134 based on periodic intervals, aperiodic intervals, at specific times, or in accordance with other time-based rules. For example, every five minutes, every 30 minutes, every hour, every month, every three months. In some instances, data sets may be streamed, in which case, the data set can be broken apart into discreet chunks of data. For example, every second, every 30 seconds, every five minutes, or other defined time period, the data set can be received in a cache or queue, and after a specified time period has been satisfied, the data can stored in discreet chunks for further analysis.

The data aggregation system 134 can interface with a plurality of different application host systems 120. Each application host system 120 can have a different application programming interface (API). The data aggregation system 134 can interface with the application host system 120 according to the specific API of the application host system 120. For example each application host system 120 can have different operational parameters that include different data sets. The data sets can have different structures, different data types, different data attributes, different data sources, and/or other characteristics that differentiate data sets between application host systems 120. Each application host system 120 can have a different architecture for generating and providing the data to the data aggregation system 134. The data aggregation system 134 can be configured to interface with each application host system 120 individually. In some embodiments, the data aggregation system 134 can include plug-in type modules associated with each application host system 120. The plug-in module can interface with the application host system 120 in accordance with an application host system 120 specific API. In some embodiments, the plug-in module may be associated with a specific data type that may be utilized by the data aggregation system 134 to interface with multiple application host systems 120 that utilize the same or similar data type or system.

2. Model Generation System

The model generation system 132 can be configured to generate one or more anomaly detection models. The model generation system 132 can use one or more machine learning algorithms to determine one or more machine learning models or parameter functions. The machine learning algorithms can be configured to adaptively develop and update anomaly detection models and/or electronic filters based on input data sets along with one or more desired outcome criteria. The anomaly detection models can be generated using one or more machine learning algorithms based on a defined rule set associated with the algorithms. The inputs for the machine learning algorithms may include aggregated historical data received from the application host systems, anomaly identification information (such as, for example, true positive and false positive indications), contextual data associated with anomaly indications (such as, for example, contextual tags associated with an event), anomaly detection rule sets, and other inputs.

Some examples of machine learning algorithms that can be used to generate and update the anomaly detection models can include supervised and non-supervised machine learning algorithms, including regression algorithms (such as, for example, Ordinary Least Squares Regression), instance-based algorithms (such as, for example, Learning Vector Quantization), decision tree algorithms (such as, for example, classification and regression trees), Bayesian algorithms (such as, for example, Naive Bayes), clustering algorithms (such as, for example, k-means clustering), association rule learning algorithms (such as, for example, Apriori algorithms), artificial neural network algorithms (such as, for example, Perceptron), deep learning algorithms (such as, for example, Deep Boltzmann Machine), dimensionality reduction algorithms (such as, for example, Principal Component Analysis), ensemble algorithms (such as, for example, Stacked Generalization), and/or other machine learning algorithms.

In some embodiments, individual models can be customized for individual data sets. The model generation system 132 can generate the anomaly detection model by determining characteristics and patterns of operation associated with a data set. In some embodiments, the model generation system 132 generates a base model. The base model may be used as a starting point to generate additional models specific to a data type, a data set, conditional situations, or other variations. In some embodiments, the model generation system 132 can be configured to utilize a plurality of techniques to generate models for analysis of the aggregated data. For example, human pattern recognition can be used to identify anomalies based on available information sources. In some embodiments, statistical methods can be employed to establish baseline thresholds that flag anomalous behaviors. Other techniques may include using a pre-defined thresholds or data values. Over time model generation system 132 can continue to update the anomaly detection models.

3. Anomaly Analysis System

The anomaly analysis system 136 can be configured to analyze the aggregated data using the anomaly detection model generated by the model generation system 132. The anomaly analysis system 136 can apply the generated model to a new data set to determine a rating associated with the analyzed data set. The rating can be used to determine whether the values of a specific instance of the data set are not consistent with the expected values of the data set. In some embodiments, the anomaly analysis system 136 can generate a score, such as, for example a value between 0 and 100. If the score exceeds a defined threshold, system can generate an event associated with the data set, such as an indication of a detected data anomaly. The analysis system 136 may also perform further analysis on the data set to identify additional information associated with instance of the data set. In some embodiments, the analysis system 136 can perform additional analyses associated with statistical information associated with the data set, such as, for example analyses of a mean, standard deviation, maximum value, minimum value, and other statistical analyses of the data set, to determine anomalies associated with the information that may not be apparent from the data set originally received from the data source. In some embodiments the analysis system 136 can compare the data set values to historical information to determine a classification or category that may be associated with the predicted anomaly. For example, the system can automatically determine that the predicted event that triggered the generation of anomalous data is a server shutdown, a bug, or another category of problems.

In some embodiments, the analysis system 136 may generate scores associated with each data set within a data table. The analysis system 136 may then generate an aggregate anomaly score for the data table based on individual scores of each data set. In some embodiments, the aggregate data table score may be based on an average score, or mean of the data sets within the data table. In some embodiments, the aggregate score can be influenced by information associated with the data source that provided the data table. A data source may have an associated trust or health level that can influence the algorithm used to determine the aggregate score. For example, a data table from a low heath data source may be more likely to trigger an anomaly score. The anomaly analysis system 136 can provide the score and additional information associated with the detected event, which can be provided to the feedback system 138 for reporting the information.

4. Anomaly Feedback System

The anomaly feedback system 138 can be configured to generate anomaly reports associated with the data analysis performed on a data set and/or data table. The feedback system 138 can generate information that can be provided to subscribers associated with the data set. For example, the feedback system can generated encrypted alert data packets configured to be displayed on a subscriber device. In some embodiments, the information can include each data set that includes an anomaly score that exceeds a determined threshold. The information can also include predicted reasons for the occurrence of the anomaly. The information may be configured to be sent via email, SMS, or other communication channel to increase the likelihood that the information can be provided an evaluated by the subscriber expeditiously. Depending on the severity of the anomaly, different actions may be performed by the feedback system. In some embodiments, a feedback system 138 may continue to send the information and/or reminders on a periodic basis. The feedback system can have a ruleset(s) governing transmission of the alerts. For example, the rules can determine who receives an alert, how the alert is transmitted, which may be based on the level of severity of the alert, and other rules governing transmission of the alerts.

The feedback system 138 can be configured to receive feedback information associated with a data set. The feedback information can be provided to the model generation system 132 and/or the anomaly analysis system 136 for further analysis. For example, the feedback system 138 may receive feedback from a subscriber indicating whether the indicated anomaly was a true positive or a false positive. Additionally, the anomaly feedback system 138 may receive contextual information from a subscriber, such as tags or a description of the anomaly. The feedback received can be associated with a specific data set, which can be used to update anomaly detection models. The feedback system 142 can include a user interface that is configured to provide information to an administrator or other user to access anomaly information and to electronically submit information on whether the indicated anomalies are true positives or false positives (for example, a spike in online downloads on Christmas day), along with possible explanation data or an identifier that indicates the reason why the detected event is not an anomaly.

5. Data Store

The interactive computing system 120 can include one or more data stores 124 that are configured to store the aggregated account information received from application host systems 120, anomaly detection models, contextual information, feedback information, and/or other information associated with the operation of the anomaly detection system.

VI. Anomaly Detection Model Generation

Figure 2A:
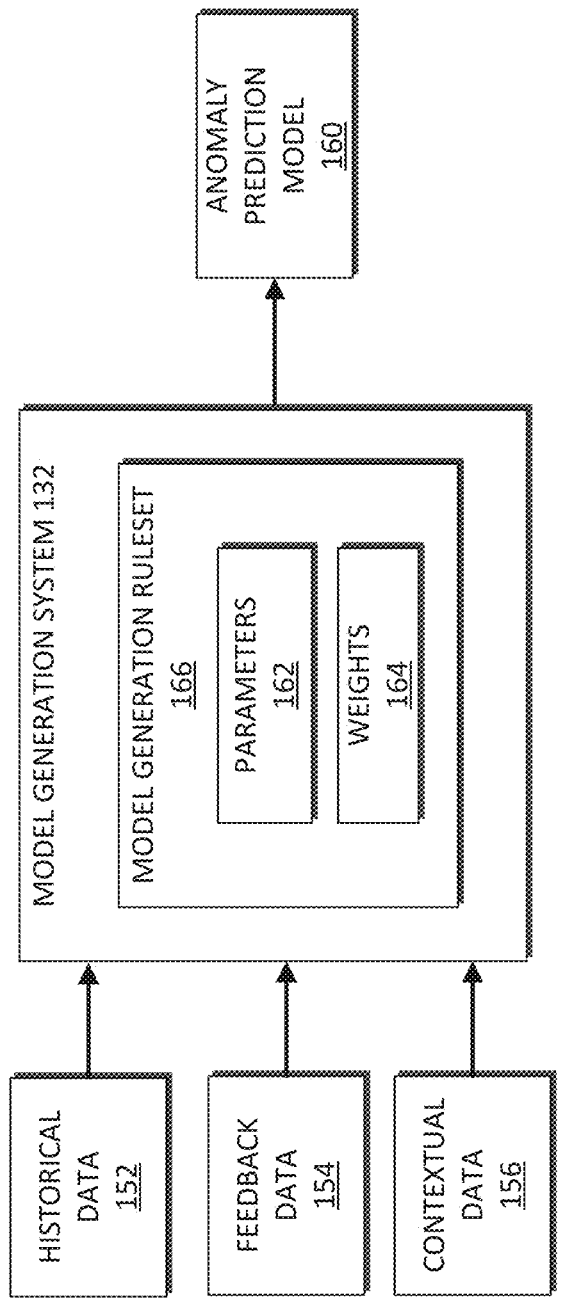
FIG. 2A presents a block diagram illustrating an embodiment of generating an anomaly detection model by a model generation system.

FIG. 2A illustrates an embodiment of a model generation system 132 configured for the generation of an anomaly detection model 160. The model generation system can generate an anomaly detection model 160 based, at least in part, on inputs received from the data aggregation system 134 and/or the feedback system 138. The input information can include historical data 152, contextual data 154, feedback data 154, and/or other input data for use by the model generation system 132 to generate the anomaly detection model 160.

The historical data 152 can include data received from one or more data sources, such as, for example, an application host system 120. The historical data 152 can include data from different application host systems 120, different data sources, different data types, and any data generated by the application host systems. In some embodiments, the historical data 152 may include a very large number of data points, such as millions of data points, aggregated by the data aggregation system 134. In some embodiments, depending on the anomaly detection model being generated, the historical data 152 may be filtered to include a subset of the total available data. For example, the historical data may only include data of one or more defined data types in accordance with a model generation rule set 166.

Figure 4B:
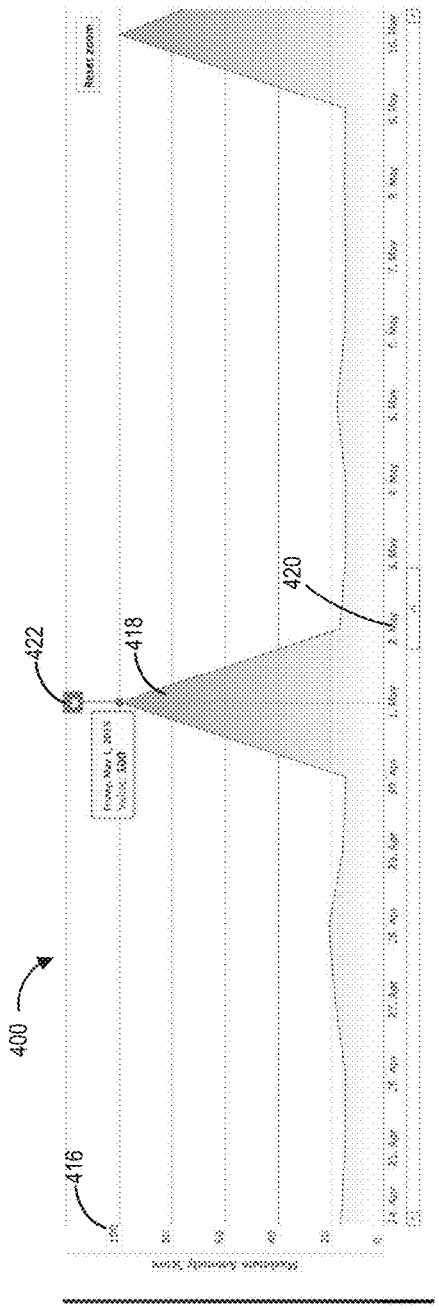
Figure 4C:
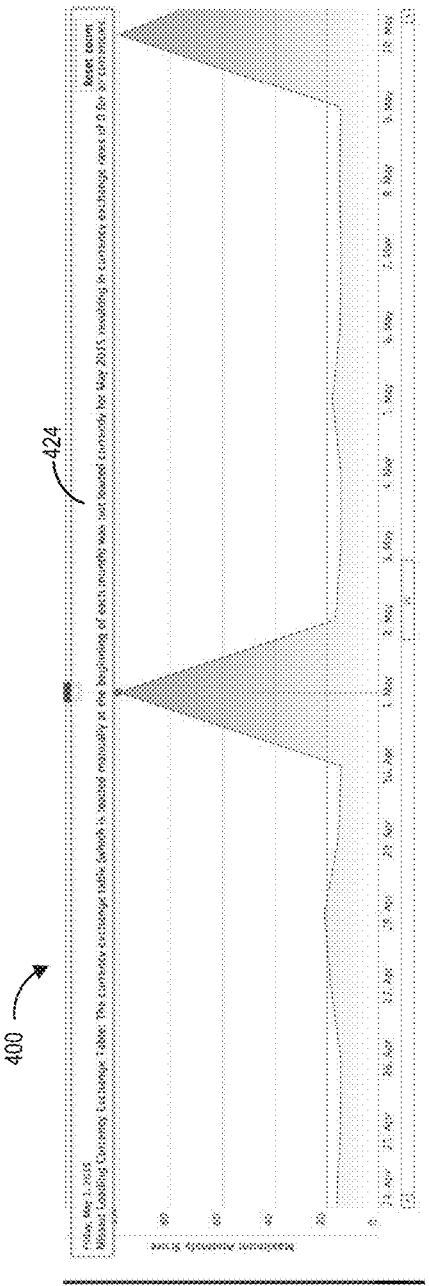

The feedback data 154 can include data received by the anomaly feedback system 138. The feedback data can include an indication of whether an anomaly event was a true positive or a false positive. A true positive indicates that the anomaly analysis system 136 correctly detected an anomaly in a data set. A false positive indicates that the anomaly analysis system 136 incorrectly identified an anomaly in a data set. The feedback information may further be associated with contextual data 156. For example, an indication of a false positive may be associated with an identifier that can help explain the reason that the detected anomaly event was not an actual anomaly. In some embodiments, the anomaly detection system may use active learning techniques to update the anomaly detection models. For example, the anomaly detection system can provide a user interface (for example, as illustrated in FIGS. 4A-4C) that can receive feedback from the user indicating whether a detected anomaly is a false positive or a true positive. Additionally, the anomaly detection system may be configured to dynamically provide additional anomaly events to a user to label. The information provided by the user can be fed back into the model generation system to update the anomaly detection model. The anomaly detection model 160 may updated in the background after the information is received.

The contextual data 156 can include information that is associated with one or more data sets, data models, previous anomaly events, and/or other types of information that can provide context to data received and processed by the anomaly detection system 130. The contextual data can provide context for real-world events that impact the data received by the anomaly detection system 130. The contextual events can identify player-specific events, game application-specific events, server-specific events, service-specific events, other specific events, and/or be generally applicable to the data received (for example, a holiday). The contextual data for an event may contain information such as, name, description, start/end dates, identifiers or tags, and other information specific to an event. The contextual data may not be associated with a specific anomaly event, but may be an independently defined event. In some embodiments, one or more tags or identifiers may be associated with an event. The tags can be configured to provide contextual information associated with the data. The identifiers may be user-defined terms (for example, holiday, production, and the like) a pre-defined list of terms associated with categories of data (for example, a game, a platform, a data source, and the like), or other categories of identifiers that can be used to organize and categorize the data. For example, contextual information may identify that a specific date is a holiday, a game launch day, a patch day, or any other type of contextual information that can be associated with the data. The contextual data is generally provided by a user. In some embodiments, the contextual identifiers can be used for categorize anomalies. Each identifier can be a category that the anomaly is associated with.

In some embodiments, the contextual data can be automatically aggregated. The contextual data may be automatically aggregated by the application host data aggregation system 134 or another data aggregation system. For example, the aggregation system may automatically ingest holiday calendar dates from online resources, automatically search the web for news articles related to specific games and create entries based on the news articles, automatically search social media websites (such as, Twitter, Facebook, Reddit) for game-related posts, automatically scan emails for event-related details (such as system maintenance, downtimes, game releases, and the like), and/or other types of contextual data.

Figure 2B:
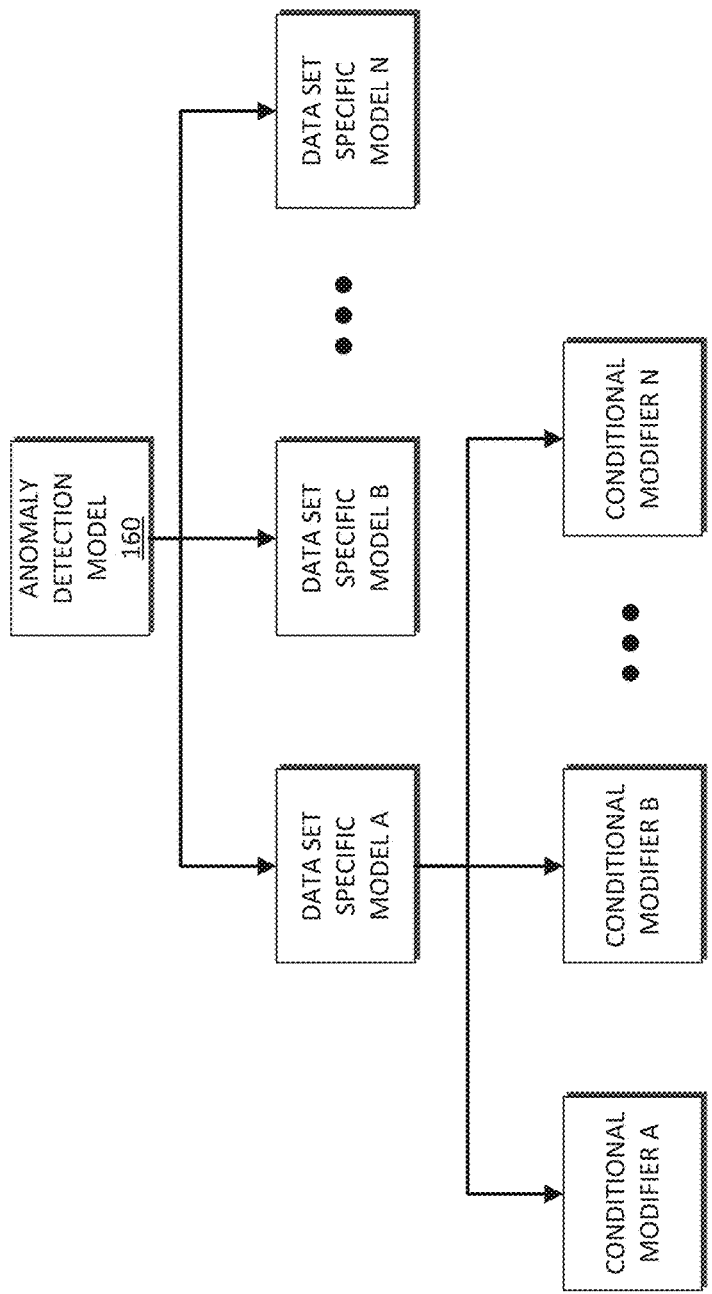
FIG. 2B illustrates an embodiment of a branching anomaly detection model.

The contextual data 156, such as contextual identifiers, can be used by the model generation system 132 to generate and update a model. The model generation system 132 can use the identifiers as conditions to trigger a different analysis of the data and/or use of a different model. The contextual information can be used to generate specific conditions that are used to generate and apply the anomaly detection model 160. For example, FIG. 2B illustrates an embodiment of a branching anomaly detection model 160 that includes a plurality of conditional nodes that can be used based on identification of a triggering condition, such as a contextual identifier.

In some embodiments, the anomaly detection system can use additional data for generation of the model, such as, for example, observed values of a time series, difference of the values observed compared to the average observed at different time periods (e.g. Last day, last 3 days, last week, last month, last 3 months, last year, all time ranges, error estimates for the observed value if the historical data was fit with different regression models, user specified collections of metrics to form a group that can be used to compute correlations and differences of the values across different metrics, histograms of tags assigned to contextual notes that falls within the time range, word distributions and models of the descriptions provided for the contextual notes that falls within a time range, and other types of information.

The model generation system 132 may generally include a model generation rule set (or "ruleset") 166 for generation of the anomaly detection model 160. The rule set 166 may include one or more parameters 162. Each set of parameters 162 may be combined using one or more mathematical functions to obtain a parameter function. Further, one or more specific parameters may be weighted by the weights 164. In some cases, the parameter function may be obtained by combining a set of parameters with a respective set of weights 164. The anomaly detection model 160 and/or the respective parameters 162 of the prediction models 160 may be derived during a training process based on particular input data, such as the historical data 152, feedback data 154, and/or contextual data 156, and defined output criteria used for training purposes. The model generation rule set 166 can define the specific machine learning rules and/or algorithms the model generation system 132 uses to generate the model based on a defined objective function, such as detecting anomalous data. In some embodiments, initial parameters 162 and weights 164 can be manually provided during the initiation of the model generation process. In some embodiments, unsupervised machine learning techniques can be used to determine the initial parameters 162 and weights 164 based on the historical data 152. The parameters 162 and weights can be updated and modified during the model generation phase to generate the anomaly detection model 160.

The model generation system 132 can filter and categorize the data sets according to various characteristics and parameters of the data. For example, the data can be categorized by the data source (such as, for example, game application data or host application data), information type (such as, for example, gameplay information, transaction information, interaction information, game account information), or other categories associated with the data. In some embodiments, the model generation system 132 is configured to filter and separate the data sets into defined data tables comprising a plurality of data sets before further processing.

The model generation system 132 can identify information associated with the data that is relevant to identifying patterns and trends. The anomaly detection model 160 can be configured to detect whether variations in a data set exceed an expected deviation. The anomaly detection model 160 can be configured to rate or score the variations in the data. In some embodiments, the model generation system 132 can generate a plurality of anomaly detection models 160. Each anomaly detection model 160 can be used based on specified criteria, such as different data types or processing categories. In some embodiments, the anomaly detection system may use active learning techniques to update the anomaly detection models. For example, the anomaly detection system can provide a user interface (for example, as illustrated in FIGS. 4A-4C) that can receive feedback from the user indicating whether a detected anomaly is a false positive or a true positive. In some embodiments, the anomaly detection system may be configured to dynamically provide additional anomaly events to a user to label. The information provided by the user can be fed back into the model generation system to update the anomaly detection model. The model 160 may updated in the background after the information is received.

After the anomaly detection model 160 has been generated, the model can be used during runtime of the anomaly detection system for real-time or near real-time detection of anomaly events after the data sets have been received. For example, the anomaly detection model 160 may be capable of analyzing data received from data sources within seconds of receiving the data. The anomaly detection system 130 can send a notification to a user indicating a detected anomaly shortly thereafter.

With additional reference to FIG. 2B, an embodiment of a branching model hierarchy for an anomaly detection model 160 is illustrated. In some embodiments, the model generation system 132 can be configured to generate a base anomaly detection model 160. The base model can provide an initial starting point when a new data set is being evaluated. Over time, the base model can be adapted to be specific to an identified data set. The data set specific model can be configured to have new, omitted, or modified parameters 162 and/or weights 164 of the base model to be more specific to the identified data set. Data models, such as the data set specific models and/or the base anomaly detection model may also include conditional modifiers. The conditional modifiers can be configured to modify the parameters and/or weights based on the presence of a conditional event. Though not illustrated, the conditional modifiers can be applied to a base model in the same way as they can be applied to data set specific model. The conditional modifiers can be used in the presence of a triggering or conditional event. For example, contextual information 156, such as a contextual identifier, can be used to determine when a conditional modifier can be used to evaluate a data set during the model application phase. A conditional modifier may be triggered based on the date (for example, a holiday), a day of the week (for example, a weekend or a weekday), a time of day (for example, morning, afternoon, or evening), an event (for example, game maintenance), or any other identifier that the model generation system 132 can modify the anomaly detection model 160 to further refine and more dynamically automate analysis and detection of anomalous events. By further categorizing the behavior of the data sets, the anomaly detection model 160 can generate anomaly detection events specific to a data set and/or conditional event, which can reduce the frequency of reporting falsely anomalous events.

Though illustrated as a hierarchical structure, the conditional modifiers can be implicit modifiers that are not explicitly defined rules that have a defined hierarchy or structure. The model can be generated to incorporate the information associated with the conditional modifiers without generating an explicit branching analysis structure as illustrated in FIG. 2B. The conditional modifiers can be implicit modifiers that can be automatically and/or dynamically taken into consideration by the model during the analysis of the data sets. In some embodiments, each model can be generated without a base model. For example, each data set specific model can be generated individually without a parent base model. The branching model illustrated in FIG. 2B, is merely one embodiment of a system for generating anomaly detection models and should not be construed as limiting. There are any number of methodologies and model structures that can be used to generate machine learning models for the anomaly detection system 130. For example, in some embodiments, a single model can be generated that can implicitly incorporate the rule sets, hierarchies, data set specific models, conditional modifiers, and other model information without explicitly defining the information into a hierarchical structure.

The model generation system can continue to update and refine the anomaly detection models over time. As new historical data 152, feedback data 154, and contextual data 156 are received. The model generation system 132 can continue to adaptively update the models to better fit the data. The model building process can occur on a periodic basis, such as for example, minutely, hourly, daily, weekly, monthly, or as determined by the model generation system 132. In some embodiments, the model building process is event-based, such as based on amount of feedback or historical data received. In some embodiments, the update process can be schedule- or rulebased. After the model is updated, the new model can replace the current model during the model application phase. The new model can be used during the application phase until it has beenreplaced with an updated model.

FIG. 2C illustrates an embodiment of an example of the model application phase. During the model application phase, the anomaly analysis system 136 receives input data 150 from the data aggregation system 134. The input data 150 can include one or more data sets received from the application host system 120 to be analyzed. The input data 150 can include various types of additional information, such as time information (for example, year, week of the year, month of the year, day of the month, day of the week, hour of the day, minute of the hour, and the like), holiday information (for example, number of days since last national holiday, number of days to next national holiday, and the like), and other information. In some embodiments, the data set can be filtered before it is provided to the anomaly analysis system 136. For example, the data aggregation system 134 and/or the application host system 120 can filter the data.

The anomaly analysis system 136 can determine which detection model, such as any of models 160A-N, to use based on the data set and/or additional identifiers associated with data set. Additionally, as illustrated in FIG. 2B, the anomaly detection model 160 selected may be selected based on the specific data set and based on the indication of one or more conditional modifiers. Each data set can be evaluated using a different model. For example, a first data set can be evaluated using the base model and a first conditional modifier. A second data set can be evaluated using a data set specific model using no conditional identifier. In each case, the anomaly analysis system 136 can provide output data 158 associated with the analyzed input data 150. The output data 158 can be a rating, such as a score for the data on a defined scale. For example, in some embodiments, the score may be between 0 and 100, a grade A to F, a categorical indicator (for example, acceptable, unacceptable, severe, critical, and the like), or other types of rating. The output data 158 may also identify whether the score exceeded an anomaly detection threshold. The input data 150 may include a data table comprising plurality of data sets that may each be evaluated by the anomaly analysis system 136 individually. The output data 158 may include individual scores for each data set and an aggregate score associated with the data set.

III. Anomaly Detection System Interactions

Figure 3A:
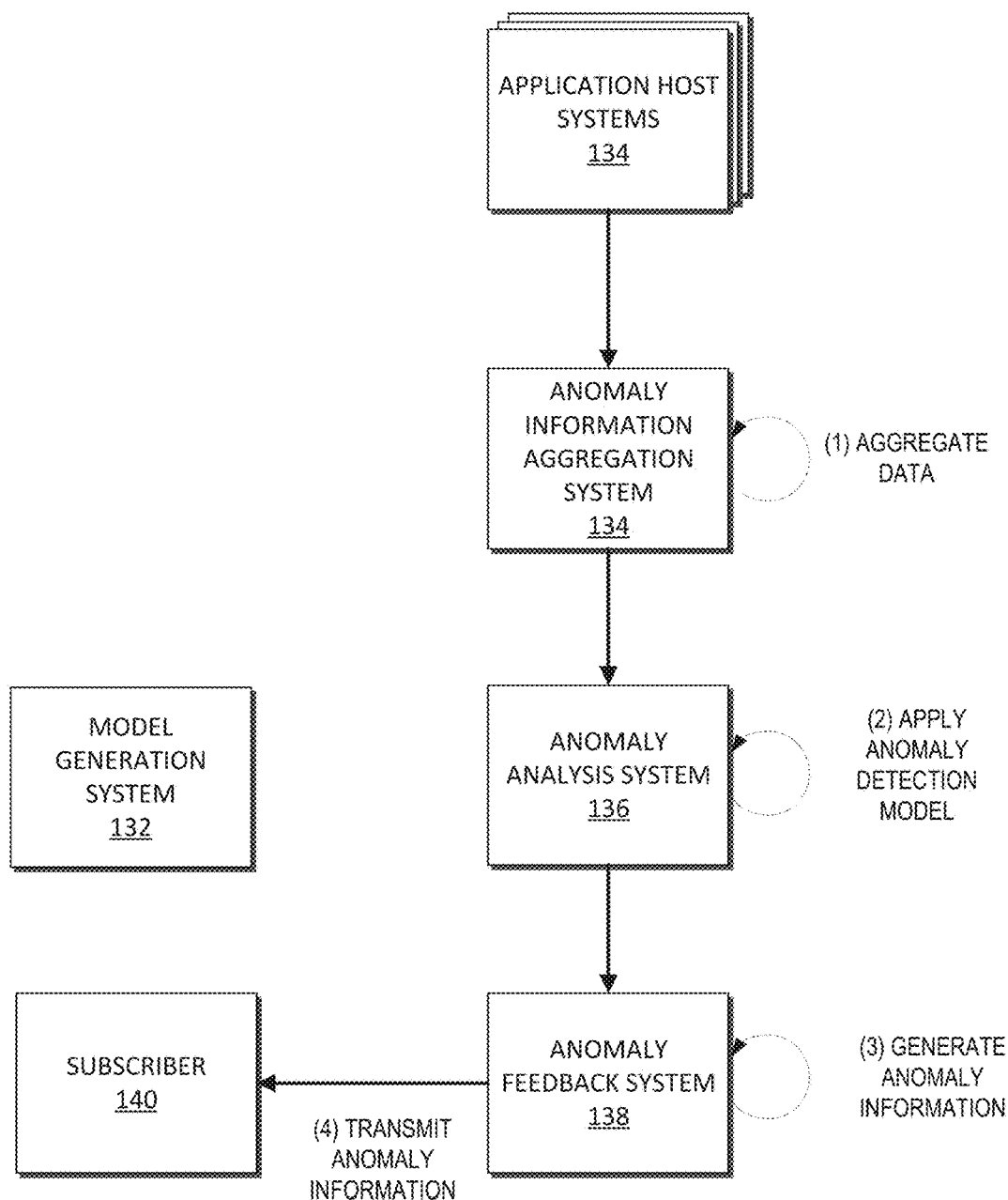
FIGS. 3A and 3B present block diagrams illustrating embodiments of various states of an anomaly prediction process.
Figure 3B:
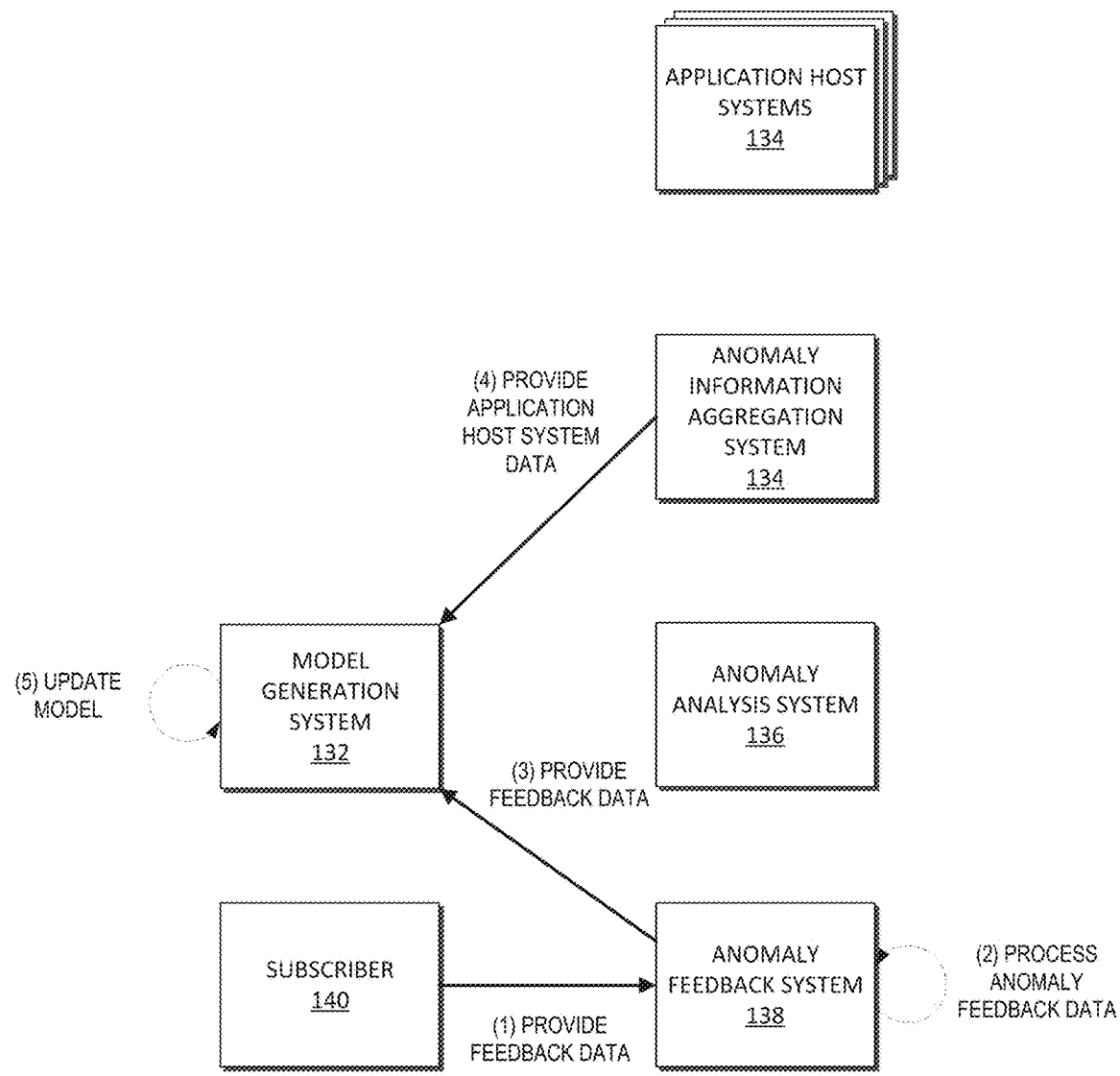

FIGS. 3A and 3B depict block diagrams of embodiments illustrating various interactions between systems of the anomaly detection system 130. FIG. 3A illustrates interactions associated with analysis of data using one or more previously generated anomaly detection models. FIG. 3B illustrates interactions associated embodiment of with updating an anomaly detection model.

A. Anomaly Detection Model Application

With reference now to FIG. 3A, interactions associated with analysis of user data sets using the generated anomaly detection model(s) 160 are illustrated. At (1), the account data aggregation system 134 aggregates host application data, which includes one or more data sets from the application host system(s) 120. The host application data may be received on time-based intervals and/or based on determined events. The data aggregation system 134 can receive data associated with the operation of the application host system 120, the game application, and/or other host applications. For example, the host application data can include server status, the number of instances of a game application, number of purchases of products within a game, number of users playing a game, number of downloads of a game, gameplay data, user communication data, gameplay telemetry data, host communication data, and other types of data associated with the operation of the game applications 122, host applications 124, and/or the application host systems 120.

The host application data generated by the application host system 120 may be filtered and processed to provide defined types and layouts for specific data tables. For example, the data may be configured into predefined data tables that include specific data sets. The data sets may be configured within a data table based on settings of the application host systems, a user, and/or the data aggregation system 134. The data aggregation system 134 may aggregate data from the various different application host systems in a substantially continuous process. The data aggregation system 134 can communicate with each application host system 120 in accordance with a defined API. The data aggregation system 134 can receive heterogeneous data from each of the various application host systems 120. After the host application data has been aggregated, it can be provided to the anomaly analysis system 136 for further processing. In some embodiments, the received data is analyzed without aggregation or filtering.

At (2), the anomaly analysis system 136 can analyze and categorize each data set provided by the data aggregation system 134. The data sets can be analyzed using the anomaly detection model 160 previously generated by the model generation system 132. The anomaly analysis system 136 can automatically analyze each data set based on an identified anomaly detection model 160. In some embodiments, a specific anomaly detection model 160 may be selected based on the specific data set and/or based on the presence of one or more conditional modifiers.

The anomaly analysis system 136 rates the data set using the identified anomaly detection model. The anomaly detection model 160 can be configured to rate or score the data set based on whether the data set values are within an expected range. In one embodiment, the score can be a value between 0 and 100. In such an embodiment, a higher score indicates a higher likelihood that the variation in the data is outside an acceptable range of values. The score can be compared to one or more anomaly detection thresholds. The anomaly detection threshold(s) can be determined by anomaly detection system 130 and/or manually controlled by a user. Lowering the anomaly detection threshold may increase the chance that variations in the data set result in a determination that the anomaly analysis system will generate an anomaly event associated with the data set. In some embodiments, more than one anomaly detection threshold can be used to analyze the data. For example, a data set can be identified as having a higher or lower likelihood of being inconsistent with the expected results. Additionally, one or more actions can be associated with each anomaly detection threshold. The anomaly detection model 160 can be configured for real-time or near real-time detection of anomaly information after the data sets have been received. The anomaly analysis system 136 can be configured to analyze a data set and provide results within a short time after receipt of the data from the application host system 120 (for example, in less than five minutes, within 2 minutes, in less than 30 seconds, and so forth). The anomaly analysis system 136 can output a score and an indication of an anomaly event. In some embodiments, the indicator can be a binary indicator that indicates whether an anomaly was detected.

In some embodiments, the anomaly analysis system 136 may identify a category for the anomaly based on a comparison of the analysis of the data set to historical data. Each category can include defined criteria for identifying accounts within the category. In some instances, an anomaly event may satisfy the criteria for multiple categories. The categories can help provide a user with an indication of the reason why the anomaly was detected. For example, the anomaly may be similar to previous data associated with a server shutdown, which can help a user troubleshoot a problem. After the analysis, the score, the anomaly detection indicator, and/or the category can be provided to the anomaly feedback system 138 for communication to one or more subscribers and/or the application host system 120 system associated with the data set. In some embodiments, the anomaly analysis system 136 may also or instead of communicate the data directly to the application host system 120 when an anomaly is detected.

In some embodiments, the anomalous event data can be provided to other data analysis systems for further analysis. In some embodiments, the anomalous event data can function as a seed for another data analysis system. For example, anomaly detection information associated with a specific player may be analyzed to determine whether the anomalous events are associated with fraudulent activities associated with the a specific player. In another example, a system may identify a valued player (for example, a player that spends a significant amount of money) that is experiencing difficulties conducting a transaction or having a significant amount of connection errors. The anomaly analysis system provide the information to a customer service center to help out the player or compensate the player for his difficulties. In some embodiments, the anomaly analysis system may be configured to analyze pricing metrics associated changes in metrics related to sales. For example, the anomaly detection information may utilize different pricing structures and categorize the events using specific identifiers. These events can then be comparatively analyzed by the anomaly analysis system based on the identifiers.

At (3), the anomaly feedback system 138 can generate anomaly information based on the results of the anomaly detection analysis. In some embodiments, the anomaly feedback system 138, may only identify data sets when an anomaly event is detected. The anomaly information can be provided to one or more subscribers. The feedback system can generate or provide instructions for generating a user interface that reports the results of the anomaly detection analysis. Example embodiments of an anomaly reporting interface are illustrated in FIGS. 4A-4C, which will be discussed in further detail below. The reporting interface may include the data table, the analyzed data set(s), the individual scores associated with each data set, the score associated with the data table, the anomaly indication, the threshold value(s), the categories, and/or other information associated with the analysis of the data set. In embodiments with multiple thresholds, different actions may be associated with each threshold. For example, if a lower threshold indicates a warning, the warning may be recorded, but a notice may not be sent to a subscriber. Additionally, the anomaly feedback system 138 can be configured to identify subscribers based on rules associated with a specific data set. For example, each data set and/or data table can be associated with subscribers that are scheduled to receive anomaly detection information. In some embodiments, the subscribers may be able to subscribe various levels of severity of an anomaly, such as, subscribing to only severe anomaly results the system has categorized as severe based on the system's analysis and/or the subscriber's rules/criteria.

At (4), the subscriber 140 can receive anomaly information from the anomaly feedback system 138. The information may be configured to be sent via email, SMS, or other communication channel to increase the likelihood that the information can be evaluated by the subscriber can access the anomaly detection information. In some embodiments, the may be transmitted to the subscriber. In some embodiments, a network-based link to the reporting interface can be used to access the information. For example, the transmitted information may include only a portion of the information with a link to a reporting interface that includes additional information associated with the anomaly event. Additionally, the transmitted information may include a control or other input that enables a subscriber to respond to the anomaly information and provide feedback. The feedback system 142 can additionally provide access to a user interface that outputs information associated with the anomaly event in order for the subscriber to take one or more actions associated with the event. For example, the user interface can provide a control or user interface element for the subscriber to indicate whether any of the anomalies are a false positive or a true positive for submission back to the anomaly detection system.

B. Anomaly Detection Model Update

With reference now to FIG. 3B, interactions associated with updating the anomaly prediction model are illustrated. At (1), the subscriber can provide feedback data to the system based on the anomaly report. The feedback data can include an indication of whether any identified anomaly was a true positive or a false positive. In some embodiments, the feedback data can include feedback data 154 and contextual data 156. The contextual data may identify a specific reason or identifier associated with the response. For example, a response indicating that an anomaly identified was a false positive could be accompanied by an indication that the increased load for accessing a download server was due to the release of a game patch. The information may be provided by the user via email, SMS message, via a network-based input form, or another application system that can be used to communicate with the anomaly feedback system 138. The information received by the feedback system can be analyzed and provided to the anomaly analysis system 136.

At (2), the anomaly feedback system 138 can process the feedback data and/or contextual data. The contextual data may identify specific conditional identifiers associated with the feedback provided by the subscriber. For example, the anomaly feedback system 138 may classify the conditional identifiers according to defined classes. In some embodiment, a user may be involved in the processing of the feedback data and/or the contextual data prior to providing it to the model generation system. At (3), the anomaly feedback system 138 may provide the feedback data and/or contextual data to the model generation system 132. At (4), the data aggregation system 134 may aggregate historical application host system's 120 data and provide it to the model generation system 132. The historical data can be provided to the model generation system 132 when a model update process is being performed, which may be done on a periodic or aperiodic basis.

At (5), the model generation system 132 can update the anomaly detection model based, at least in part, on the error and false positive information received from the feedback system 142 and update the model accordingly. The update to one or more anomaly detection models may be based, at least in part, on the new historical data, the feedback data, and/or contextual data. After the anomaly detection model has been updated, the anomaly detection model can be used to analyze data sets received from the application host system data in accordance with the interactions described in association with FIG. 3A.

Example Embodiments on an Anomaly Detection System Interface

FIGS. 4A-C illustrate embodiments of a user interface 400 for the anomaly detection system 130. FIG. 4A illustrates an embodiment of user interface illustrating a table view of the results of an anomaly detection analysis on a plurality of data sets. In this embodiment, the user interface 400 includes a plurality of data sets 402, statistics associated with the data set 404, an anomaly score 406, anomaly score details 408, an anomaly event feedback annotation 410, a link to additional statistics 412, and a user control 414 to provide feedback annotations. The data set 402 being analyzed is identified along with the specific statistical analyses 404 that were performed on the data set using the machine learning model. Each analysis of a data set can include a separate anomaly score 406. The analysis may also include additional analysis details 408 associated with the analysis. The interface can include an interface control 410 that allows for a user to input feedback associated with the anomaly event. As indicated, a user can identify whether the anomaly is a true positive ("Issue") or a false positive ("Acceptable"). In some embodiment, the user interface can be configured to dynamically provide additional anomaly events to a user to label. The information provided by the user can be fed back into the model generation system to update the anomaly detection model. The interface also provides for additional statistics to be shown that are associated with the data set. Examples of additional statistics are illustrated in FIGS. 4B and 4C.

FIGS. 4B and 4C illustrate another view of the user interface 400. The view is a chart view of the results of an anomaly detection analysis illustrating additional information associated with a data set. The additional information can be configured to show a timeline 420 of historical data associated with the data set. The timeline can be updated each time an anomaly detection analysis is performed on the data set. The timeline can include a scale 416 associated with the time, such as an anomaly score. The data set scores can be displayed in a visual format 418. The timeline may additionally include controls 422 that can provide contextual information 424 (as illustrated in FIG. 4C) associated with a particular data point. For example, the specific contextual information 424 displayed in FIG. 4C provides an explanation for the anomaly.

Anomaly Detection Process

Figure 5:
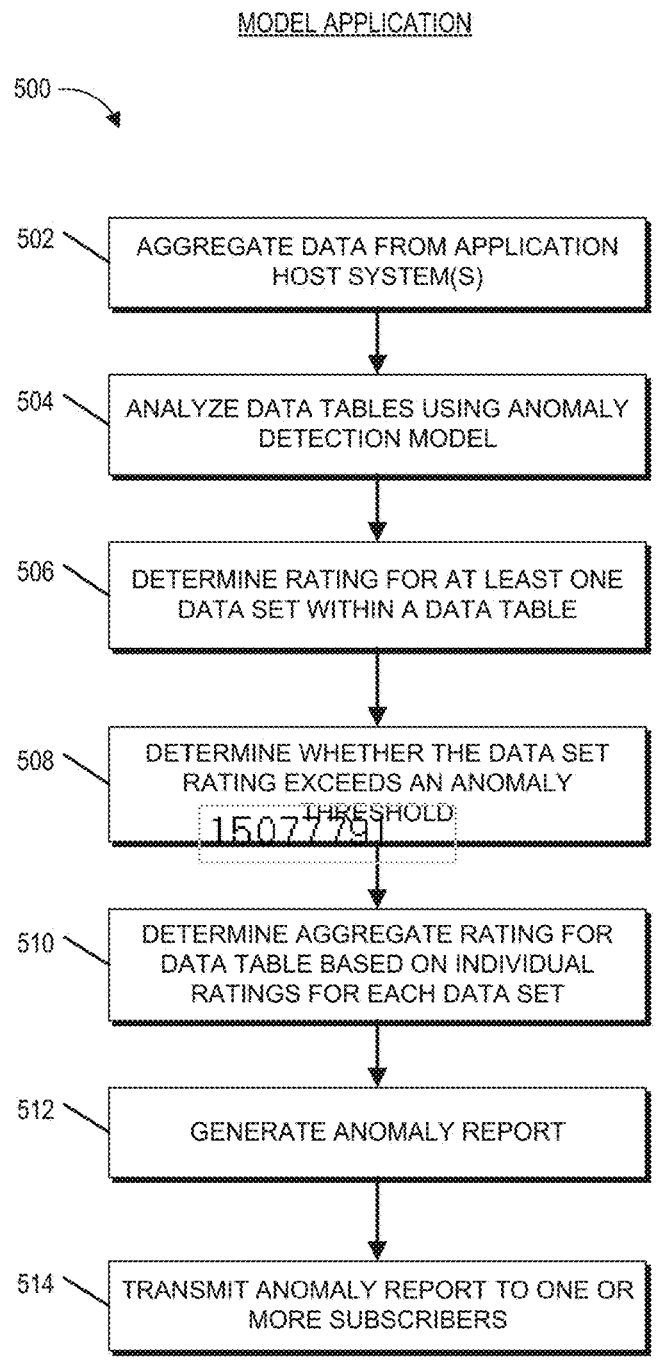
FIG. 5 illustrates a flowchart of an embodiment of an anomaly detection process.

FIG. 5 illustrates an embodiment of a flowchart for a process for anomaly detection for host application data from an application host system. The process 500 can be implemented by any system that can interface with an application host system to analyze data associated with characteristics of the host application system and/or game applications operating on the host application system. For example, the process 500, in whole or in part, can be implemented by an anomaly detection system 130, a data aggregation system 134, an anomaly analysis system 136, an anomaly feedback system 138, or other computing system. Although any number of systems, in whole or in part, can implement the process 500, to simplify discussion, the process 500 will be described with respect to the.

At block 502, the anomaly detection system 130 aggregates host application data. The host application data can include one or more data sets from the application host system 120. The host application data may be received on time-based intervals and/or based on determined events. The host application data 134 can receive host application data associated with the operation of the application host system 120, the game application, and/or host application(s) 124. Examples of data received from the host application system 1120 may include server status, the number of instances of a game application, number of purchases of products within a game, number of users playing a game, number of downloads of a game, gameplay data, user communication data, gameplay telemetry data, host communication data, and other types of data associated with the operation of the game applications 122, host applications 124, and/or the application host systems 120. The anomaly detection system 130 may aggregate data from the various different application host system 120s in a substantially continuous process. The anomaly detection system 130 may communicate with each application host system 120 in accordance with a defined API. The data aggregation system 134 can be configured to receive heterogeneous data from each of the various application host systems.

At block 504, the anomaly detection system 130 can individually analyze and categorize each data set provided by the application host system 120 during runtime. The anomaly detection system 130 can identify at least one previously generated anomaly detection model 160 for analysis of a data set. The anomaly detection system 130 can automatically analyze each data set based on an identified anomaly detection model 160. In some embodiments, an anomaly detection model 160 may be selected based on the specific data set and/or based on one or more conditional modifiers.

At block 506, the anomaly detection system 130 determines a rating associated with the data set. The anomaly detection model 160 can be configured to determine the rating based on whether the data set values are within an expected range of values. In one embodiment, the rating can be a value between 0 and 100. In such an embodiment, a higher score indicates that the variation in the data is increasing. For example, a data set can be identified as having a higher or lower likelihood of being an inconsistent with the expected results based on the score. The anomaly detection model 160 can analyze the data sets during runtime of the host application systems such that the anomaly detection system can provide real-time or near real-time detection of anomaly information after the data sets have been received. The anomaly detection system 130 can be configured to analyze a data set and provide results within minutes of receipt of the data from the application host system 120 (for example, in less than five minutes).

At block 508, the score can be compared to one or more anomaly detection thresholds. The anomaly detection threshold(s) can be determined by anomaly detection system 130 and/or manually controlled by a user. Lowering the anomaly detection threshold can increase the chance that variations in the data set result in the determination of an anomaly event associated with the data. In some embodiments, more than one anomaly detection threshold can be used. The anomaly detection system 130 can output a rating and an indication of an anomaly detection indication. In some embodiment, the anomaly detection indication can be a binary indicator of whether an anomaly was detected.

In some embodiments, the anomaly detection system 130 may identify a predictive category associated with the anomaly event. The identification of the category can be based on a comparison of the analysis of the data set to historical data. Each predictive category can include defined criteria for identifying accounts within the category. In some instances, an anomaly may satisfy the criteria for multiple of categories. The predictive categories can help provide a user an indication for the reason why the anomaly was detected. For example, the anomaly may be similar to previous data associated with a server shutdown, which can help a user troubleshoot a problem.

At block 510, after the results of each of the data sets within a data table have received a rating, the anomaly detection system 130 can determine a rating associated with the data table. The rating associated with the data table may be an aggregate anomaly score that is based on individual scores of each data set. In some embodiments, the aggregate data table score may be based on an average score of the data sets within the data table.

At block 512, the anomaly detection system 130 can generate an anomaly information based on the results of the anomaly detection analysis. For example, the anomaly information can be encrypted data packets configured to be displayed on a subscriber device. In some embodiments, the anomaly feedback system 138 may only send information if an anomaly is detected. The anomaly information can provide information to one or more subscribers based on the results of the analysis. The anomaly information may include the data table, the analyzed data set(s), the individual scores associated with each data set, the score associated with the data table, the anomaly indication, the threshold value(s), the predictive categories, and/or other information associated with the analysis of the data set.

At block 514, the anomaly detection system 130 can transmit the anomaly information to registered subscribers associated with a specific data set. For example, each data set and/or data table can have subscribers that are registered to receive anomaly detection information. In some embodiments, the subscribers may be able to subscribe various levels of severity of an anomaly, such as, subscribing to only severe anomaly events. The anomaly event information can be sent via email, SMS, via an application notification, or other communication channel to increase the likelihood that the anomaly event can be evaluated by the subscriber on an expeditious basis. In some embodiments, the anomaly event information may be electronically transmitted directly to the subscriber. In some embodiments, a network-based link to the anomaly event information can be used to access the report and/or data. For example, the transmitted report may include only a portion of the anomaly event information with a link to a network-based interface including additional information associated with the anomaly event. Additionally, the anomaly event information may include a control or other interface element that enables a subscriber to respond the report and provide feedback. The feedback system 142 can additionally provide access to a user interface that outputs information associated with the anomaly event in order for the subscriber to take one or more actions associated with the event. For example, the report can provide a user interface element or other type of input element for the subscriber to indicate whether the anomaly is a false positive or a true positive.

Anomaly Detection Model Update Process

Figure 6:
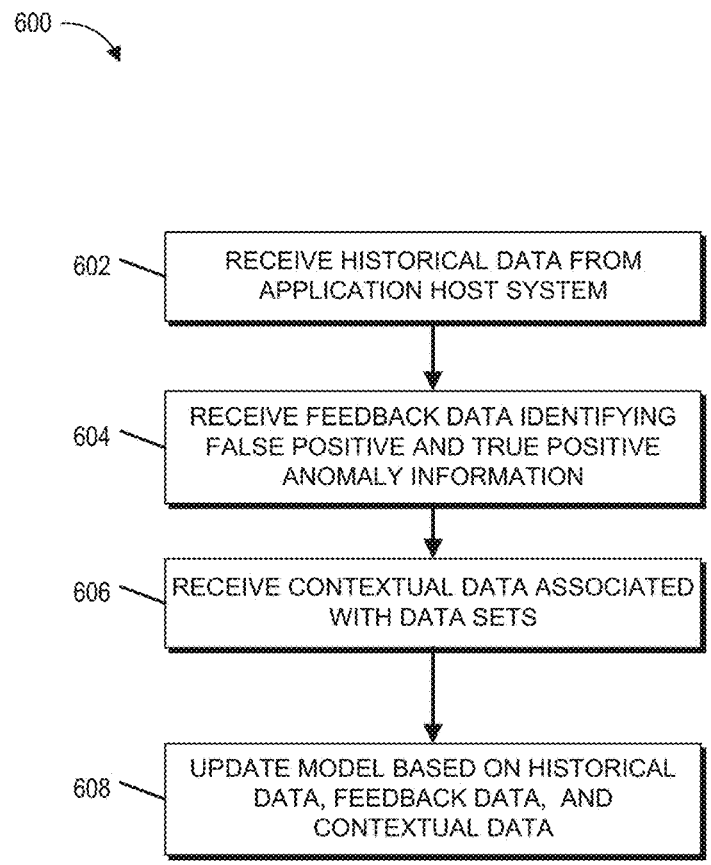
FIG. 6 illustrates a flowchart of an embodiment of an anomaly detection model update process.

FIG. 6 illustrates an embodiment of a flowchart for a process for updating an anomaly detection model. The process 600 can be implemented by any system that can generate a machine learning model. For example, the process 600, in whole or in part, can be implemented by an anomaly detection system 130, a model generation system 132, an anomaly analysis system 136, an anomaly feedback system 138, or other computing system. Although any number of systems, in whole or in part, can implement the process 600, to simplify discussion, the process 600 will be described with respect to the anomaly detection system 130.

At block 602, the anomaly detection system 130 can receive historical data generated by the application host system 120. The historical data can be data associated with a plurality of data sets. For example, the anomaly detection system 130 can aggregate data from thousands of data sets. The anomaly detection system 130 can pre-process the feedback data prior to using the data for updating the model.

At block 604, the anomaly detection system 130 can receive feedback data associated with one or more data sets. The feedback data can be used to identify instances where the anomaly detection system 130 correctly or incorrectly identified anomalous data received from the application host system 120. For example, the feedback data may identify false positive and true positive information associated with previously detected anomaly events.

At block 606, the anomaly detection system 130 can receive contextual data associated with one or more data sets. The contextual data may identify a specific reason or identifier associated with a previously detected anomaly event. For example, an anomaly event that was identified as a false positive could be accompanied by contextual data indication that the increased load for accessing a download server was due to the release of a game patch. The contextual data may identify specific conditional identifiers associated with the feedback provided by the subscriber. For example, the anomaly detection system 130 may classify the conditional identifiers according to defined classes.

At block 608, the anomaly detection system 130 can update the anomaly detection model based, at least in part, on the historical data, the feedback data, and/or the contextual data. Depending on the specific embodiment, an update to one or more anomaly detection models may be based, at least in part, on information received from the data aggregation system 134 and/or information received from the anomaly feedback system 138. After the anomaly detection model has been updated, the anomaly detection model can be used to analyze application host system 120 data in accordance with the interactions described in association with FIG. 3A.

Overview of Computing Device

Figure 7:
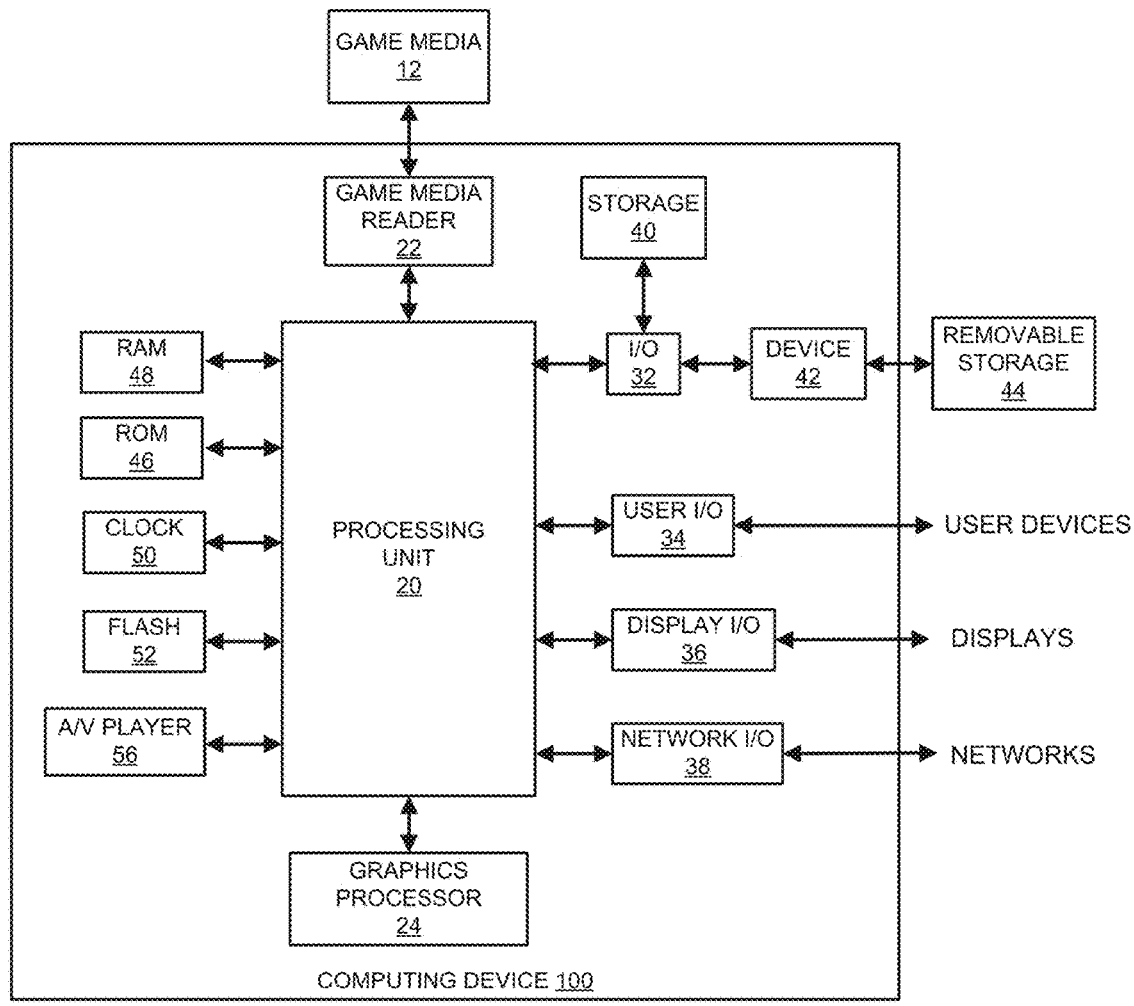
FIG. 7 illustrates an embodiment of a computing device.

FIG. 7 illustrates an embodiment of computing device 110 according to the present disclosure. Other variations of the computing device 110 may be substituted for the examples explicitly presented herein, such as removing or adding components to the computing device 110. The computing device 110 may include a game device, a smart phone, a tablet, a personal computer, a laptop, a smart television, a car console display, a server, and the like. As shown, the computing device 110 includes a processing unit 20 that interacts with other components of the computing device 110 and also external components to computing device 110. A media reader 22 is included that communicates with media 12. The media reader 22 may be an optical disc reader capable of reading optical discs, such as CD-ROM or DVDs, or any other type of reader that can receive and read data from game media 12. One or more of the computing devices may be used to implement one or more of the systems disclosed herein.

Computing device 110 may include a separate graphics processor 24. In some cases, the graphics processor 24 may be built into the processing unit 20. In some such cases, the graphics processor 24 may share Random Access Memory (RAM) with the processing unit 20. Alternatively, or in addition, the computing device 110 may include a discrete graphics processor 24 that is separate from the processing unit 20. In some such cases, the graphics processor 24 may have separate RAM from the processing unit 20. Computing device 110 might be a handheld video game device, a dedicated game console computing system, a general-purpose laptop or desktop computer, a smart phone, a tablet, a car console, or other suitable system.

Computing device 110 also includes various components for enabling input/output, such as an I/O 32, a user I/O 34, a display I/O 36, and a network I/O 38. I/O 32 interacts with storage element 40 and, through a device 42, removable storage media 44 in order to provide storage for computing device 110. Processing unit 20 can communicate through I/O 32 to store data, such as game state data and any shared data files. In addition to storage 40 and removable storage media 44, computing device 110 is also shown including ROM (Read-Only Memory) 46 and RAM 48. RAM 48 may be used for data that is accessed frequently, such as when a game is being played or the fraud detection is performed.

User I/O 34 is used to send and receive commands between processing unit 20 and user devices, such as game controllers. In some embodiments, the user I/O can include a touchscreen inputs. The touchscreen can be capacitive touchscreen, a resistive touchscreen, or other type of touchscreen technology that is configured to receive user input through tactile inputs from the user. Display I/O 36 provides input/output functions that are used to display images from the game being played. Network I/O 38 is used for input/ output functions for a network. Network I/O 38 may be used during execution of a game, such as when a game is being played online or being accessed online and/or application of fraud detection, and/or generation of a fraud detection model.

Display output signals produced by display I/O 36 comprising signals for displaying visual content produced by computing device 110 on a display device, such as graphics, user interfaces, video, and/or other visual content. Computing device 110 may comprise one or more integrated displays configured to receive display output signals produced by display I/O 36. According to some embodiments, display output signals produced by display I/O 36 may also be output to one or more display devices external to computing device 110, such a display 16.

The computing device 110 can also include other features that may be used with a game, such as a clock 50, flash memory 52, and other components. An audio/video player 56 might also be used to play a video sequence, such as a movie. It should be understood that other components may be provided in computing device 110 and that a person skilled in the art will appreciate other variations of computing device 110.

Program code can be stored in ROM 46, RAM 48 or storage 40 (which might comprise hard disk, other magnetic storage, optical storage, other non-volatile storage or a combination or variation of these). Part of the program code can be stored in ROM that is programmable (ROM, PROM, EPROM, EEPROM, and so forth), part of the program code can be stored in storage 40, and/or on removable media such as game media 12 (which can be a CD-ROM, cartridge, memory chip or the like, or obtained over a network or other electronic channel as needed). In general, program code can be found embodied in a tangible non-transitory signal-bearing medium.

Random access memory (RAM) 48 (and possibly other storage) is usable to store variables and other game and processor data as needed. RAM is used and holds data that is generated during the execution of an application and portions thereof might also be reserved for frame buffers, application state information, and/or other data needed or usable for interpreting user input and generating display outputs. Generally, RAM 48 is volatile storage and data stored within RAM 48 may be lost when the computing device 110 is turned off or loses power.

As computing device 110 reads media 12 and provides an application, information may be read from game media 12 and stored in a memory device, such as RAM 48. Additionally, data from storage 40, ROM 46, servers accessed via a network (not shown), or removable storage media 46 may be read and loaded into RAM 48. Although data is described as being found in RAM 48, it will be understood that data does not have to be stored in RAM 48 and may be stored in other memory accessible to processing unit 20 or distributed among several media, such as media 12 and storage 40.

It is to be understood that not necessarily all objects or advantages may be achieved in accordance with any particular embodiment described herein. Thus, for example, those skilled in the art will recognize that certain embodiments may be configured to operate in a manner that achieves or optimizes one advantage or group of advantages as taught herein without necessarily achieving other objects or advantages as may be taught or suggested herein.

All of the processes described herein may be embodied in, and fully automated via, software code modules executed by a computing system that includes one or more computers or processors. The code modules may be stored in any type of non-transitory computer-readable medium or other computer storage device. Some or all the methods may be embodied in specialized computer hardware.

Many other variations than those described herein will be apparent from this disclosure. For example, depending on the embodiment, certain acts, events, or functions of any of the algorithms described herein can be performed in a different sequence, can be added, merged, or left out altogether (for example, not all described acts or events are necessary for the practice of the algorithms). Moreover, in certain embodiments, acts or events can be performed concurrently, for example, through multi-threaded processing, interrupt processing, or multiple processors or processor cores or on other parallel architectures, rather than sequentially. In addition, different tasks or processes can be performed by different machines and/or computing systems that can function together.

The various illustrative logical blocks and modules described in connection with the embodiments disclosed herein can be implemented or performed by a machine, such as a processing unit or processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A processor can be a microprocessor, but in the alternative, the processor can be a controller, microcontroller, or state machine, combinations of the same, or the like. A processor can include electrical circuitry configured to process computer-executable instructions. In another embodiment, a processor includes an FPGA or other programmable device that performs logic operations without processing computer-executable instructions. A processor can also be implemented as a combination of computing devices, for example, a combination of a DSP and a microprocessor, a plurality of microprocessors, one or more microprocessors in conjunction with a DSP core, or any other such configuration. Although described herein primarily with respect to digital technology, a processor may also include primarily analog components. For example, some or all of the signal processing algorithms described herein may be implemented in analog circuitry or mixed analog and digital circuitry. A computing environment can include any type of computer system, including, but not limited to, a computer system based on a microprocessor, a mainframe computer, a digital signal processor, a portable computing device, a device controller, or a computational engine within an appliance, to name a few.

Conditional language such as, among others, "can," "could," "might" or "may," unless specifically stated otherwise, are otherwise understood within the context as used in general to convey that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without user input or prompting, whether these features, elements and/or steps are included or are to be performed in any particular embodiment.

Disjunctive language such as the phrase "at least one of X, Y, or Z," unless specifically stated otherwise, is otherwise understood with the context as used in general to present that an item, term, etc., may be either X, Y, or Z, or any combination thereof (for example, X, Y, and/or Z). Thus, such disjunctive language is not generally intended to, and should not, imply that certain embodiments require at least one of X, at least one of Y, or at least one of Z to each be present.

Any process descriptions, elements or blocks in the flow diagrams described herein and/or depicted in the attached figures should be understood as potentially representing modules, segments, or portions of code which include one or more executable instructions for implementing specific logical functions or elements in the process. Alternate implementations are included within the scope of the embodiments described herein in which elements or functions may be deleted, executed out of order from that shown, or discussed, including substantially concurrently or in reverse order, depending on the functionality involved as would be understood by those skilled in the art.

Unless otherwise explicitly stated, articles such as "a" or "an" should generally be interpreted to include one or more described items. Accordingly, phrases such as "a device configured to" are intended to include one or more recited devices. Such one or more recited devices can also be collectively configured to carry out the stated recitations. For example, "a processor configured to carry out recitations A, B and C" can include a first processor configured to carry out recitation A working in conjunction with a second processor configured to carry out recitations B and C.

It should be emphasized that many variations and modifications may be made to the above-described embodiments, the elements of which are to be understood as being among other acceptable examples. All such modifications and variations are intended to be included herein within the scope of this disclosure.

What is claimed is:

1. An anomaly detection computing system, the system comprising:
    a host application computing system including one or more hardware processors and in electronic communication with an anomaly detection server, the one or more hardware processors of the host application computing system configured to execute computer-readable instructions that configure the host application computing system to execute and host instances of a game application and establish gameplay sessions with a plurality of users;
    a host data store configured to store host application data associated with operation of the host application computing system, wherein the host application data comprises a plurality of data sets, wherein individual data sets of the plurality of data sets are associated with operations executed by the host application computing system for operation of aspects of the game application;
    the anomaly detection server comprising one or more hardware processors and in electronic communication with the host application computing system, the one or more hardware processors of the anomaly detection server configured to execute computer-readable instructions that configure the anomaly detection server to:
        communicate with the host application computing system and aggregate the host application data received from the host application computing system, wherein the host application data comprises a data table including the plurality of data sets associated with one or more aspects of operation of the host application computing system;
        for each data set of the plurality of data sets within the data table,
            identify a first anomaly detection node of a hierarchical anomaly detection model for analysis of a data set of the plurality of data sets, wherein the hierarchical anomaly detection model is generated based, at least in part on, historical data associated with the host application computing system, the hierarchical anomaly detection model comprises a base detection model and a plurality of data set specific models, each data set specific model generated from the base detection model for a specific data set, each data set specific model having a plurality of anomaly detection nodes, wherein each detection node is associated with one or more conditional modifiers, wherein the first anomaly detection node is identified based at least in part on a presence of conditional data matching the one or more conditional modifiers associated with the first anomaly detection node;
            determine an anomaly detection score associated with the data set based, at least in part, on an application of the first anomaly detection node of the hierarchical anomaly detection model to the data set;
        determine an aggregate anomaly detection score for the data table based at least in part on the anomaly detection scores associated with each data set of the plurality of data sets within the data table;
        determine whether the aggregate anomaly detection score exceeds an anomaly detection threshold, wherein the anomaly detection threshold is determined based, at least in part, on a trust level associated with the host application computing system; and
        in response to determining that the aggregate anomaly detection score exceeds the anomaly detection threshold, generate an anomaly event, and generate instructions to perform an anomaly event action for the anomaly event associated with the anomaly detection threshold.

2. The anomaly detection computing system of claim 1, wherein the anomaly event action is to transmit an anomaly event report to at least one subscriber associated with the data set, wherein the anomaly event report comprises the anomaly detection score and data associated with the anomaly event.

3. The anomaly detection computing system of claim 2, wherein the anomaly event report comprises predictive information identifying one or more likely problems that caused the anomaly event, wherein the predictive information is based at least in part on historical information.

4. The anomaly detection computing system of claim 1, wherein the computer-readable instructions of the anomaly detection server are further configured to identify a category associated with the anomaly event.

5. The anomaly detection computing system of claim 1, wherein the computer-readable instructions of the anomaly detection server are further configured to provide instructions to a user computing device for generation of a graphical user interface configured to display information associated with anomaly detection analysis.

6. The anomaly detection computing system of claim 5, wherein the graphical user interface comprises at least one user interface element configured to receive feedback from a user indicating whether the anomaly event was correctly identified.

7. The anomaly detection computing system of claim 1, wherein the hierarchical anomaly detection model identified for a first data set of the plurality of data sets is different than a second anomaly detection model identified for a second data set of the plurality of data sets.

8. The anomaly detection computing system of claim 1, wherein the first anomaly detection node of the hierarchical anomaly detection model is identified based, at least in part, on contextual information associated with the data set, wherein the contextual information identifies one or more conditional identifiers associated with the data set.

9. The anomaly detection computing system of claim 1, wherein the hierarchical anomaly detection model is generated using machine learning techniques.

10. The anomaly detection computing system of claim 1, wherein the computer-readable instructions of the anomaly detection server are further configured to communicate with the application host computing system using a first application programming interface, and communicate with an application host computing system using a second application programming interface.

11. An anomaly detection method comprising:
communicating with a host application computing system, wherein the host application computing system is configured to execute and host instances of a game application and establish gameplay sessions with a plurality of users;
aggregating host application data received from the host application computing system, wherein the host application data comprises a data table including a first plurality of data sets associated with one or more aspects of operation of the host application computing system;
for each data set of the first plurality of data sets within the data table,
identifying a first anomaly detection node of a hierarchical anomaly detection model for analysis of a data set of the first plurality of data sets, wherein the hierarchical anomaly detection model is generated based, at least in part on, historical data associated with the host application computing system, the hierarchical anomaly detection model comprises a base detection model and a plurality of data set specific models, each data set specific model generated from the base detection model for a specific data set, each data set specific model having a plurality of anomaly detection nodes, wherein each detection node is associated with one or more conditional modifiers, wherein the first anomaly detection node is identified based at least in part on a presence of conditional data matching the one or more conditional modifiers associated with the first anomaly detection node;
determining an anomaly detection score associated with the data set based, at least in part, on an application of the first anomaly detection node of the hierarchical anomaly detection model to the data set;
determining an aggregate anomaly detection score for the data table based at least in part on the anomaly detection scores associated with each of the first plurality of data sets within the data table;
determining whether the aggregate anomaly detection score exceeds an anomaly detection threshold, wherein the anomaly detection threshold is determined based, at least in part, on a trust level associated with the host application computing system;
in response to determining that the aggregate anomaly detection score exceeds the anomaly detection threshold,
generating an anomaly event; and
generating instructions to perform an anomaly event action for the anomaly event associated with the anomaly detection threshold.

12. The anomaly detection method of claim 11, wherein performing the anomaly event action comprises transmitting an anomaly event report to at least one subscriber associated with the data set, wherein the anomaly event report comprises the anomaly detection score and data associated with the anomaly event.

13. The anomaly detection method of claim 12, wherein the anomaly event report comprises predictive information identifying one or more likely problems that caused the anomaly event, wherein the predictive information is based at least in part on historical information.

14. The anomaly detection method of claim 11 further comprising providing instructions to a user computing device for generation of a graphical user interface configured to display information associated with anomaly detection analysis.

15. The anomaly detection method of claim 14 further comprising receiving feedback through the graphical user interface indicating whether the anomaly event was correctly identified.

16. The anomaly detection system of claim 11, wherein identifying the first anomaly detection node of the hierarchical anomaly detection model is further based, at least in part, on contextual information associated the data set, wherein the contextual information identifies one or more conditional identifiers associated with the data set.

17. A non-transitory computer readable medium comprising computer-executable instructions for anomaly detection that, when executed by a computing system, cause the computing system to:
communicate with a host application computing system, wherein the host application computing system configured to execute and host instances of a game application and establish gameplay sessions with a plurality of users;
aggregate host application data received from the host application computing system, wherein the host application data comprises a data table including a first plurality of data sets associated with one or more aspects of operation of the host application computing system;
for each data set of the first plurality of data sets within the data table,
identify a first anomaly detection node of a hierarchical anomaly detection model for analysis of a data set of the first plurality of data sets, wherein the hierarchical anomaly detection model is generated based, at least in part on, historical data associated with the host application computing system, the hierarchical anomaly detection model comprises a base detection model and a plurality of data set specific models, each data set specific model generated from the base detection model for a specific data set, each data set specific model having a plurality of anomaly detection nodes, wherein each detection node is associated with one or more conditional modifiers, wherein the first anomaly detection node is identified based at least in part on a presence of conditional data matching the one or more conditional modifiers associated with the first anomaly detection node;
determine an anomaly detection score associated with the data set based, at least in part, on an application of the first anomaly detection node of the hierarchical anomaly detection model to the data set;

determine an aggregate anomaly detection score for the data table based at least in part on the anomaly detection scores associated with each of the first plurality of data sets within the data table;

determine whether the aggregate anomaly detection score exceeds an anomaly detection threshold, wherein the anomaly detection threshold is determined based, at least in part, on a trust level associated with the host application computing system;

in response to determining that the aggregate anomaly detection score exceeds the anomaly detection threshold, generate an anomaly event; and generate instructions to perform an anomaly event action for the anomaly event associated with the anomaly detection threshold.

18. The non-transitory computer readable medium of claim 17, wherein the computer-executable instructions further configure the computing system to provide instructions to a user computing device for generation of a graphical user interface configured to display information associated with anomaly detection analysis.

19. The non-transitory computer readable medium of claim 18, wherein the computer-executable instructions further configure the computing system to receive feedback through the graphical user interface indicating whether the anomaly event was correctly identified.

20. The non-transitory computer readable medium of claim 17, wherein the computer-executable instructions further configure the computing system to transmit an anomaly alert to one or more subscribers associated with the data table.

* * * * *